US011762684B2

(12) United States Patent
Yankelevich et al.

(10) Patent No.: US 11,762,684 B2
(45) Date of Patent: Sep. 19, 2023

(54) DISTRIBUTED TASK EXECUTION

(71) Applicant: WorkFusion, Inc., New York, NY (US)

(72) Inventors: Maxim Yankelevich, New York, NY (US); Andrii Volkov, New York, NY (US)

(73) Assignee: WorkFusion, Inc., New York, NY (US)

( * ) Notice: Subject to any disclaimer, the term of this patent is extended or adjusted under 35 U.S.C. 154(b) by 0 days.

(21) Appl. No.: 17/090,740

(22) Filed: Nov. 5, 2020

(65) Prior Publication Data

US 2021/0055955 A1    Feb. 25, 2021

Related U.S. Application Data

(63) Continuation-in-part of application No. 13/360,940, filed on Jan. 30, 2012, now abandoned.

(51) Int. Cl.
*G06F 9/48* (2006.01)
*G06F 9/50* (2006.01)
*G06F 9/54* (2006.01)
*G06N 5/025* (2023.01)

(52) U.S. Cl.
CPC ........... *G06F 9/485* (2013.01); *G06F 9/5027* (2013.01); *G06F 9/542* (2013.01); *G06N 5/025* (2013.01)

(58) Field of Classification Search
None
See application file for complete search history.

(56) References Cited

U.S. PATENT DOCUMENTS

| | | | |
|---|---|---|---|
| 6,810,383 B1 * | 10/2004 | Loveland | G06Q 10/06311 705/7.38 |
| 6,859,523 B1 * | 2/2005 | Jilk | G06Q 10/06 379/265.06 |
| 9,239,719 B1 * | 1/2016 | Feinstein | G06F 8/70 |

(Continued)

FOREIGN PATENT DOCUMENTS

CN          105637439 A  *  6/2016  ........... G06F 9/4881

OTHER PUBLICATIONS

Qiu et al. "CrowdSelect: Increasing Accuracy of Crowdsourcing Tasks through Behavior Prediction and User Selection" (2016) (https://people.engr.tamu.edu/caverlee/pubs/qiu16cikm.pdf) (Year: 2016).*

*Primary Examiner* — Sujay Koneru
(74) *Attorney, Agent, or Firm* — Baker Botts L.L.P.

(57) ABSTRACT

Particular embodiments manage distribution of tasks to heterogeneous group of computing devices is disclosed. Computing devices in the group may have disparate attributes that may affect handling of a specific task (e.g., processing speed, network bandwidth, GPU availability, utilization, type of operating system, availability of certain utilities). Tasks may be received from task-requester computer systems, and each task may be associated with an information set. This information set may comprise a description of the task, a token to be provided for completion of the task, and at least one task-processing rule for a task result provided by one or more computing devices involved in handling the task. Task results are received and compared to the task-processing rule until the task-processing rule is satisfied.

20 Claims, 17 Drawing Sheets

(56) References Cited

U.S. PATENT DOCUMENTS

| | | | |
|---|---|---|---|
| 2005/0197936 A1* | 9/2005 | Berstis | G06Q 10/0631 705/35 |
| 2006/0106675 A1* | 5/2006 | Cohen | G06Q 30/08 705/37 |
| 2007/0073720 A1* | 3/2007 | Clarke | H04L 51/56 |
| 2007/0244736 A1* | 10/2007 | Johnson | G06Q 10/10 705/7.27 |
| 2008/0046834 A1* | 2/2008 | Yu | G06Q 10/06316 715/771 |
| 2008/0162242 A1* | 7/2008 | Schneur | G06Q 10/06316 705/7.14 |
| 2009/0070767 A1* | 3/2009 | Garbow | G06F 9/5066 718/104 |
| 2009/0132331 A1* | 5/2009 | Cartledge | G06Q 10/10 705/7.27 |
| 2010/0293026 A1* | 11/2010 | Vojnovic | G06Q 10/101 705/348 |
| 2011/0196802 A1* | 8/2011 | Ellis | G06F 16/334 707/723 |
| 2011/0307391 A1* | 12/2011 | Mercuri | G06Q 10/06311 705/300 |
| 2012/0029978 A1* | 2/2012 | Olding | G06Q 10/06398 705/7.42 |
| 2012/0072268 A1* | 3/2012 | Ritter | G06Q 10/06 705/7.39 |
| 2012/0072817 A1* | 3/2012 | Dubey | G06F 16/248 715/205 |
| 2012/0088220 A1* | 4/2012 | Feng | G09B 7/00 434/362 |
| 2012/0197677 A1* | 8/2012 | Bhamidipaty | G06Q 10/06311 705/7.13 |
| 2012/0232907 A1* | 9/2012 | Ivey | G06F 21/30 704/E13.001 |
| 2012/0265573 A1* | 10/2012 | Van Pelt | G06Q 10/06311 705/7.14 |
| 2013/0095460 A1* | 4/2013 | Bishop | G09B 5/06 434/308 |
| 2013/0159040 A1* | 6/2013 | Sarmenta | G06Q 10/06 463/43 |
| 2013/0176438 A1* | 7/2013 | Mate | H04N 7/185 348/157 |
| 2013/0198750 A1* | 8/2013 | Charif | G06F 8/20 718/102 |
| 2013/0275803 A1* | 10/2013 | Kern | G06F 40/51 714/15 |
| 2016/0062441 A1* | 3/2016 | Chou | G06F 1/3287 713/320 |
| 2016/0306673 A1* | 10/2016 | You | G06F 9/5044 |
| 2018/0027177 A1* | 1/2018 | Lin | H04N 5/772 348/207.1 |
| 2018/0326583 A1* | 11/2018 | Baroudi | B25J 9/1661 |
| 2018/0357541 A1* | 12/2018 | Chen | G06N 3/04 |
| 2020/0167694 A1* | 5/2020 | Pisner | G06F 9/4881 |
| 2020/0218567 A1* | 7/2020 | Kim | G06F 9/5044 |

* cited by examiner

FIG. 3

| ID | TITLE | KEYWORDS | TYPE | REWARD | # OF ASIGNMENTS | SCHEDULE | TES SPECS | TES QUALITY | RULES | ... |
|---|---|---|---|---|---|---|---|---|---|---|
| TASK_1 304 | TITLE_A 308 | TAG.BLOG 312 | CATEGORIZATION 316 | $0.02 320 | $0.02 324 | N/A | N/A | HIGH 336 | RULE_1 340 | ... |
| TASK_2 | TITLE_B | ANALYZE CODE | VALIDATE | $0.05 | $0.05 | 1 WEEK 328 | SOFTWARE 332 | N/A | N/A | ... |
| ... | ... | ... | ... | ... | ... | ... | ... | ... | ... | ... |

FIG. 4

| ID | CONTACT INFO | QUALIFICATIONS | QUALITY RATING | WORK HISTORY | REWARD HISTORY | SECURITY CREDENTIALS | ... |
|---|---|---|---|---|---|---|---|
| WORKER_1 404 | CI_A 408 | QUAL_A QUAL_B 412 | HIGH 416 | WHSTRY_A 420 | RHSTRY_A 424 | SC_A 428 | ... |
| WORKER_2 | CI_B | QUAL_N | LOW | WHSTRY_B | RHSTRY_B | SC_B | ... |
| ... | ... | ... | ... | ... | ... | ... | ... |

FIG. 9

DESCRIBE YOUR TASK

- TEMPLATE NAME*: NAME_A
- TITLE*: TITLE_A
- DESCRIPTION*: DESCRIPTION_A
- KEYWORDS*: TAG_BLOG
- TYPE*: CATEGORIZATION

PAYING WORKERS

- REWARD PER ASSIGNMENT*: 0.02
- NUMBER OF ASSIGNMENTS PER TASK*: 3

[SAVE] [CANCEL]

Tabs: 1. ENTER PROPERTIES | 2. ANSWERS | 3. QUALIFICATIONS & RULES | 4. NOTIFICATIONS | 5. ADVANCED

1. ENTER PROPERTIES    2. ANSWERS    3. QUALIFICATIONS & RULES    4. NOTIFICATIONS    5. ADVANCED — 912

ADJUDICATION RULE

[ RULE 1 ] — 1104

EXPECTED QUALIFICATIONS

WORKERS MUST MEET THE FOLLOWING QUALIFICATIONS TO WORK ON THESE HITS: [ QUAL_A, QUAL_B ] — 1106

[ ADD ] QUALIFICATIONS

☐ REQUIRED FOR PREVIEW (WHAT'S THIS?)

TIP: YOU CAN LIMIT YOUR HITS TO WORKERS WITH A CERTAIN APPROVAL RATE. AN APPROVAL RATING OF 95% OR BETTER IS CONSIDERED GOOD

FIG. 12

1. ENTER PROPERTIES    2. ANSWERS    3. QUALIFICATIONS & RULES    4. NOTIFICATIONS    5. ADVANCED — 914

1202

ACCEPT, REJECT AND NOTIFICATION TEMPLATES

WORKER WILL RECEIVE THE FOLLOWING MESSAGE WHEN HIS ANSWER IS ACCEPTED    [ DEFAULT ACCEPT TEMPLATE ▼ ] — 1204

WORKER WILL RECEIVE THE FOLLOWING MESSAGE WHEN HIS ANSWER IS REJECTED    [ DEFAULT REJECT TEMPLATE ▼ ] — 1206

WORKER WILL RECEIVE THE FOLLOWING MESSAGE WHEN HIS HIT IS PUBLISHED, ASSUMING WORKER MET THE QUALIFICATION REQUIREMENTS    [ DEFAULT NOTIFY TEMPLATE ▼ ] — 1208

[ SAVE ]    [ CANCEL ]

| 1. ENTER PROPERTIES | 2. ANSWERS | 3. QUALIFICATIONS & RULES | 4. NOTIFICATIONS | 5. ADVANCED |

ADVANCED PROPERTIES

EXTERNAL FORM URL*  URL_A — 1304

TIME ALLOTED PER ASSIGNMENT*  15  MINUTES — 1306

TASK EXPIRES IN*  365  DAYS — 1308

TASK AVAILABILITY  M-F; 9:00 A.M.–5:00 P.M. — 1310

RESULTS ARE AUTOMATICALLY APPROVED IN*  30  DAYS — 1312

FRAME HEIGHT*  2500

SAVE    CANCEL

FIG. 13

WORKFLOW_1 — 1502

| SUMMARY | WORKERS RESULTS 1504 |

WORKERS STATISTIC
TOTAL NUMBER OF WORKERS  5
TOTAL  $2.50

SUBMISSIONS STATS
SUCCESSFUL SUBMISSIONS  125
FAILED SUBMISSIONS  30
MANUAL REVIEW SUBMISSIONS  0
PENDING SUBMISSIONS  1
AVERAGE SUBMISSION PRICE  $0.02

BEST WORKERS — 1508

| WORKER ID | ACCURACY | AVERAGE TIME SPENT | REWARD AMOUNT | BONUS |
|---|---|---|---|---|
| WORKER_1 | 100% (40/40) | 27s | $0.80 | N/A |

WORST TASKS — 1510

| HIT ID | ASSIGNMENTS COUNT |
|---|---|
| TASK_1 | 2 |

BACK — 1506

FIG. 15

CATEGORIZE AN EXCERPT OF TEXT ABOUT MOBILE PHONE CARRIERS

BONUSES OF $10 WILL BE PAID OUT TO THE TOP 10 WORKERS WHO PARTICIPATE IN THE MOST TASKS WITH THE HIGHEST ACCURACY!

THE FOLLOWING EXCERPT MENTIONS   COMPANY_A

PLEASE READ THE FULL TEXT SPECIFICALLY LOOKING FOR HOW ANY OF THE FOLLOWING KEYWORDS ARE DISCUSSED:

Company_A, CompA, ComA, companya, cmA...

IN MOST CASES, THE RELEVANT KEYWORD(S) IS HIGHLIGHTED IN [YELLOW]. SCAN FOR THE HIGHLIGHTED KEYWORDS TO QUICKLY FIND THE RELEVANT PORTION OF TEXT FOR YOUR REFERENCE. EXAMPLES ARE LISTED AT THE BOTTOM OF THIS PAGE.

TITLE: RT@_XYZ_:A...

I SEARCHED THE HASHTAG FOR [COMPANY_A] AND ALL I SAW WAS NEGATIVE INFORMATION. I JUST SWITCHED OVER FROM COMPANY_B TO [COMPANY_A] #WORSTMISTAKEOFMYLIFEPART1

WHEN YOU THINK ABOUT HOW THE ABOVE KEYWORDS ARE MENTIONED IN THIS TEXT, HOW WOULD YOU DESCRIBE THE WAY IN WHICH THEY ARE REFERENCED? IF MORE THAN ONE CATEGORY MATCHES, CHOOSE THE MOST SPECIFIC CATEGORY YOU FEEL APPLIES:

⦿ NEUTRAL
○ NEGATIVE
○ POSITIVE
○ IRRELEVANT

FIG. 19

DISTRIBUTED TASK EXECUTION

PRIORITY

This application is a continuation-in-part under 35 U.S.C. § 120 of U.S. patent application Ser. No. 13/360,940, filed 30 Jan. 2012, which is incorporated herein by reference.

TECHNICAL FIELD

Particular embodiments generally relate to distributed task execution.

SUMMARY

Particular embodiments manage automated distribution of tasks to heterogeneous groups of task-execution computing devices, which may be disparate or organized into one or more clusters. Computing devices in the group, representing resource available for the resolution of the task, may have disparate attributes that may affect their speed, efficiency, and/or accuracy at handling a specific task (e.g., processing speed, network bandwidth, GPU availability, utilization, type of operating system, availability of certain utilities). Tasks may be received from task-requester computer systems, and each task may be associated with an information set. This information set may comprise a description of the task, a token to be provided for completion of the task, and at least one task-processing rule for assessment of task results provided by one or more of the task-execution computing devices involved in handling the task. Tasks may be distributed among available task-execution computing device. Task results may be assessed under the task-processing rule until the task-processing rule is satisfied. In particular embodiments, a specific task may be distributed to more than one task-execution system.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 3 is a table illustrating one example of task data according to one embodiment;

FIG. 4 is a table illustrating one example of task-execution system data according to one embodiment;

FIG. 9 shows one example of a template for creating a task for a task-distribution environment according to one embodiment;

FIG. 11 shows one example of a template for creating an task-processing rule for a task in a task-distribution environment according to one embodiment;

FIG. 12 shows one example of a template for selecting notification templates for a task in a task-distribution environment according to one embodiment;

FIG. 13 shows one example of a template for entering advanced options for a task in a task-distribution environment according to one embodiment;

FIG. 15 shows one example of a report displaying summary information for a task workflow in a task-distribution environment according to one embodiment;

FIG. 19 shows one example of a template presented to a user for participating in a task of a task-distribution environment according to one embodiment;

DESCRIPTION OF EXAMPLE EMBODIMENTS

Figure 1:
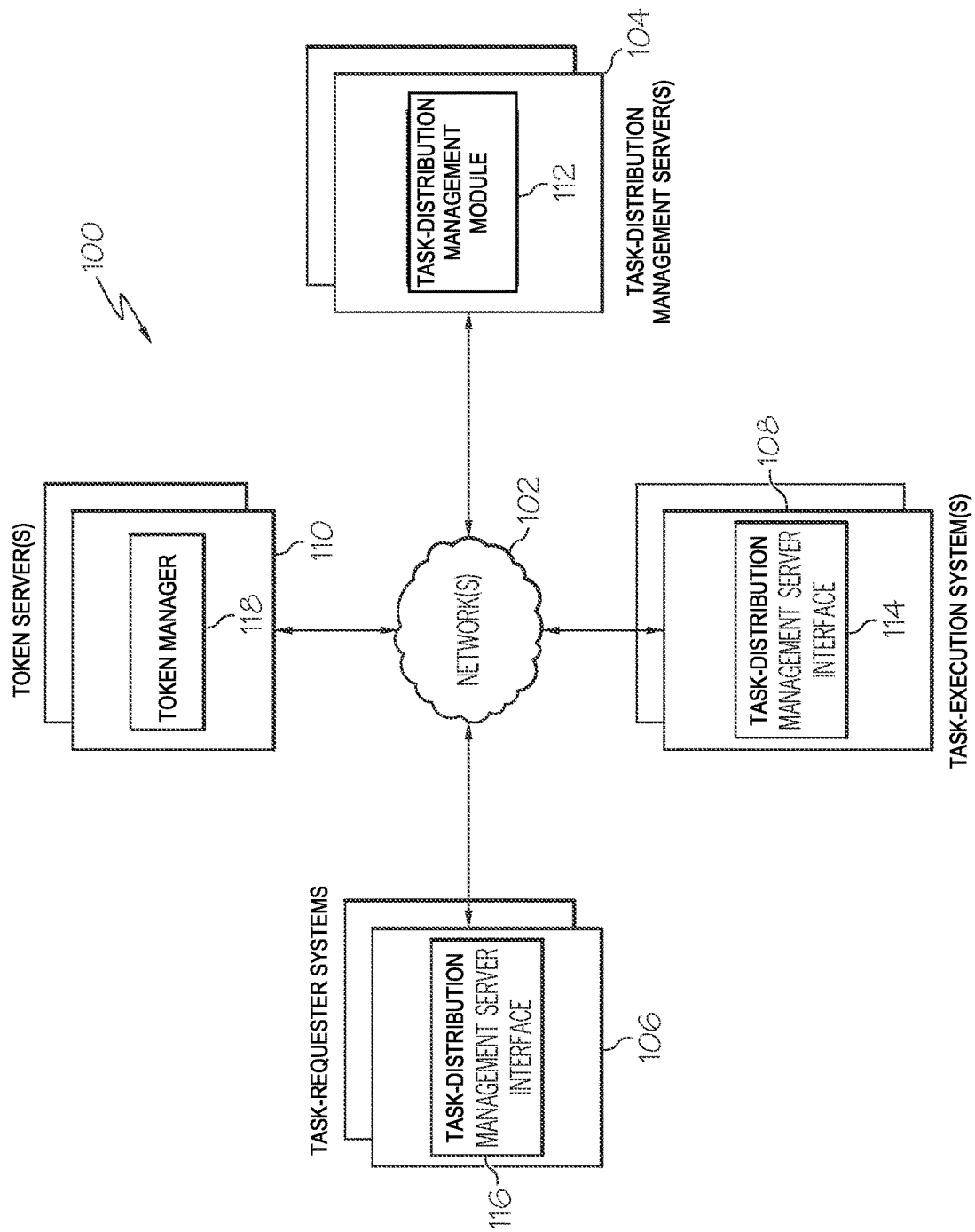
FIG. 1 is a block diagram illustrating one example of an operating environment according to one embodiment.

FIG. 1 shows one example of an operating environment 100 according to one embodiment. The operating environment 100 comprises one or more networks 102 that, in one embodiment, can include wide area networks, local area networks, wireless networks, and/or the like. It should be noted that the network 102 comprises various networking hardware (and software) components such as gateways, routers, firewalls, etc., which are not shown for simplicity. The environment 100 includes a plurality of information processing systems 104, 106, 108, 110 that are communicatively coupled to the network(s) 102. The information processing systems 104, 106, 108, 110 include one or more task-distribution management servers 104, one or more task-requester systems 106, one or more task-execution systems 108, and one or more token management servers 110. The environment 100 can also include additional systems such as admin systems, database systems, storage systems, etc., which are not shown in FIG. 1. Task-execution systems 108 and task-requester systems 106 interact with the task-distribution management server 104 via an interface 114, 116 or programmatically via an API(s).

Throughout this discussion a "task-requester system" refers to computing device from which a task to the task-distribution management server 104 to be distributed (e.g., published, broadcast, promoted, etc.) to a set of one or more heterogeneous task-execution systems. Heterogeneous computing devices can be comprised of a cluster or an unassociated group of task-execution computing devices. A "task" (also referred to as a "problem") comprises one or more actions to be performed by one or more of the heterogeneous task-execution systems. The result of the heterogeneous task-execution systems performing these requested actions can be referred to as the "output" or "result" of the task. A "project" may refer to a plurality of related tasks.

Figure 2:
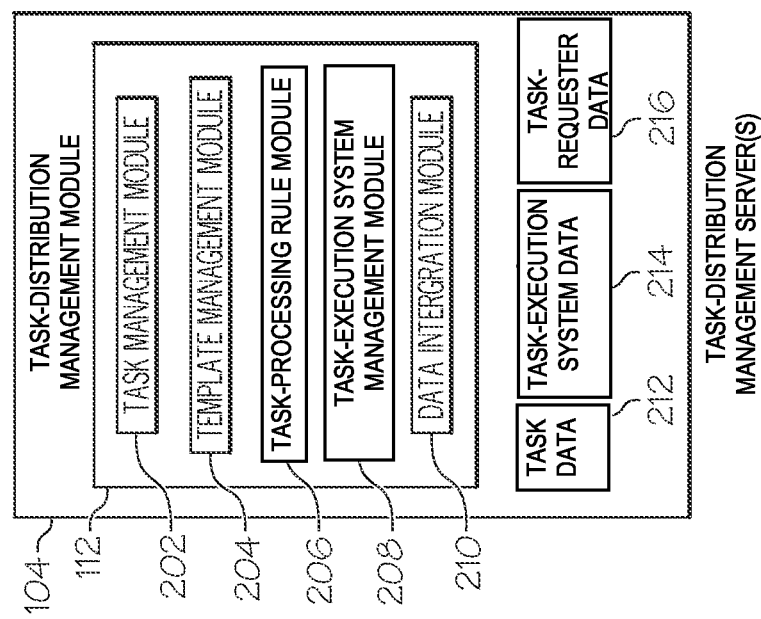
FIG. 2 is a block diagram illustrating a detailed view of a task-distribution management module according to one embodiment.

The task-distribution management server 104 comprises a task-distribution management module 112. The task-requester systems 106 and the task-execution systems 108 comprise the interfaces 114, 116 discussed above. The token server 110 comprises a token manager 118 that manages compensation for execution of tasks by task-execution systems 108. The task-distribution management module 112 of the server 104 manages a task-distribution environment provided by the server 104, as well as managing any interactions between task-requester systems 106 or task-execution systems 108 and the task-distribution environment. The task-distribution management module 112, in one embodiment, comprises a task management module 202, a template management module 204, an task-processing rule module 206, a task-execution system management module 208, and a data integration module 210, as shown in FIG. 2.

The task management module 202 manages tasks and generates tasks from information provided by a task-requester system 106 formatted based on one or more templates provided by the template management module 204. The task management module 202 maintains information associated with tasks as task data 212. This task data 212 can be stored within the task-distribution management server 104 and/or on one or systems coupled to the server 104. The template management module 204 may provide various template protocols for a task-requester system 106 or task-execution system 108 to utilize when interacting with the task-distribution management server 104. The task-processing rule module 206 manages the results provided/submitted by a task-execution system 108 for a task. The task-processing rule module 206 utilizes one or more task-processing rules or acceptance criteria to ensure that the best results of a task are identified and/or to provide a degree of confidence in the correctness of a result, or, as described herein, when additional task-execution systems 108 are required to complete a given task, task responsibilities are allocated amongst the resources of the system (e.g., the available task-execution systems 108) in an efficient and effective manner.

The task-execution system management module 208 manages the task-execution systems 108 associated with the task-distribution environment of the task-distribution management server 104. The task-execution system management module 208 maintains information associated with task-execution systems 108 as task-execution system data 214. This task-execution system data 214 can be stored within the task-distribution management server 104 and/or on one or more systems coupled to the server 104. The task-execution system management module 208, in one embodiment, uses the task-execution system data 214 for, among other things, determining which set of task-execution systems 108 to present a given task to. The data integration module 210 interfaces with one or more task-requester systems 106 to provide the data to a task-execution system 108 by which the task is to be performed. In addition to the above, the task-distribution management server 104 also comprises and maintains task-requester data 216. The task-requester data 216 comprises information associated with each task-requester system 106 that has registered with the task-distribution management server 104. The task-distribution management module 112 and its components are discussed in greater detail below.

FIG. 3 shows one example of the task data 212 maintained by the task management module 202. It should be noted that although FIG. 3 shows a single table 300 comprising records (e.g., rows) for each task a separate record/file can be stored for each task as well. Also, embodiments are not limited to a table and other structures for storing data are applicable as well. Even further, one or more columns can be added and/or removed from the table 300 as well. The table 300 in FIG. 3 comprises a plurality of columns and rows, where each row is associated with a single task. A first column 302, entitled "ID", comprises entries that uniquely identify each task associated with the task-distribution environment. For example, a first entry 304 under this column 302 identifies a first task with the unique identifier of "Task 1". The task ID can be automatically assigned by the task management module 202 upon creation of a task.

A second column 306, entitled "Title", comprises entries 308 that provide the title of the corresponding task. This title may be provided by the task-requester system 106 during the task creation/submission process or automatically generated by the task management module 202. It should be noted that the table 300 can also include an additional column (not shown) for providing a more detailed description of the task. A third column 310, entitled "Keywords", comprises entries 312 that comprise optional keywords for the corresponding task. These keywords allow the task-requester system 106 or task-execution system 108 to search for tasks being maintained by the server 104. It should be noted that tasks can be search for by the task-requester system 106 or task-execution system 108 based on any of the information shown (and not shown) in FIG. 3.

Keywords may be provided by the task-requester system 106 during the task creation/submission or automatically generated by the task management module 202. The task-distribution management module 112 can use the keywords to determine which tasks to publish/promote to which task-execution systems 108. The task-distribution management module 112 can then match tasks to specific task-execution systems 108 based on the task-execution system 108's profile and the keywords associated with the task. In addition, the task-distribution management module 112 can analyze a task-execution system 108's previous work history, work performance, qualifications, etc. and determine that the task-execution system 108 excels in a specific task area. The task-distribution management module 112 can use the keywords associated with a task to ensure that tasks associated with this specific task area(s) are published/promoted to the task-execution system 108. It should be noted that the task-distribution management module 112 can utilize any of the information in the task data 212 for determining which task-execution systems 108 to select for notification of a given task.

A fourth column 314, entitled "Type", comprises entries 316 that identify a task type for the corresponding task. For example, a first entry 316 under this column 314 indicates that Task_1 is a categorization task. Other non-limiting examples of a task type are rank, validate, or moderate. A task type can be manually assigned to a task by or automatically assigned by the task management module 202. A fifth column 318, entitled "Reward", comprises entries 320 that identify the type and/or value of the token provided for execution of the corresponding task. For example, a first entry 320 under this column 318 indicates that a task-execution system 108 will receive $0.02 for completing the corresponding task (or completing the corresponding task with the correct output, given amount of time, etc.). The value of the token can be monetary, physical goods, services, changes in levels of access to information or functionality, or any other type of value selected by the task-requester system 106. A sixth column 322, entitled "# of Assignments", comprises entries 324 that indicate a maximum number of task-execution systems 108 that can participate in the task, a minimum number of task-execution systems 108 that can participate in the task, a current number of task-execution systems 108 currently participating in the task, and/or the like. For example, a first entry 324 under this column 322 indicates that the maximum number of unique task-execution systems 108 that can participate in the corresponding task is 3. A seventh column 326, entitled "Schedule", comprises entries 328 that provide optional scheduling information for a corresponding task. Scheduling information can include a task duration (e.g., how long the task is available for), a work duration (e.g., how long a task-execution system 108 has to complete the task), distribution schedule (e.g., a given date and/or time when the task is to be distributed), and/or the like.

An eighth column 330, entitled "TES Specs" (e.g., "Task Execution System Specs"), comprises entries 332 identifying optional attributes of task-execution systems 108 for the corresponding task. These specifications/attributes can be any condition defined by the user that a task-execution system 108 must satisfy prior to being selected for or allowed to participate in a task. These qualifications can be geographic requirements, previous work history requirements, previous task work performance, performance characteristics of the task-execution system 108 and/or the like. Previous task work performance can include metrics such as an average task completion time, average/number correct results, and/or any other metrics that can be used to represent a task-execution system 108's work performance. The requirements under this column 330 can be used by the task management module 202 to select/filter task-execution systems 108 for participation in the corresponding task. A ninth column 334, entitled "TES Quality" (e.g., "Task-Execution System Quality"), comprises entries 336 identifying optional quality requirements for the corresponding task. A quality requirement identifies a specific quality rating/metric that must be associated with a task-execution system 108 in order for a task-execution system 108 to be selected for or allowed to participate in a task. This quality rating/metric is assigned to a task-execution system 108 by the task-execution system management module 208 based various factors such as previous task work performance, duration of association with the task-distribution environment, and/or any other factor/metric that allows the task-execution system management module 208 to assign a weight, rating, or metric that represents the overall quality of a task-execution system 108.

A tenth column 338, entitled "Rules", comprises entries 340 that include or identify task-processing rules to be applied to the output of task-execution systems 108 for a given task. The entries can comprise the actual rules or an identifier/flag that allows the task-processing rule module 206 to locate the applicable rules (e.g., acceptance criteria) in another table or storage area (not shown). An task-processing rule ensures that the best possible task result(s) is returned to the task-requester system 106, that the most appropriate or efficient task-execution system 108 has performed or will perform a given task, or that a given degree of accuracy and/or confidence can be associated with task results. For example, to confirm a task result, a task-processing rule may indicate that additional task-execution systems 108 may be required to complete a given task. As an example, a task-processing rule may indicate that additional task-execution systems 108 are to be assigned to a task until a given percentage/threshold of task-execution systems 108 have provide the (substantially) same task result/solution and use the matching result as the final task result. Therefore, a task-processing rule may provide a way to limit the number of task-execution system 108 involved in processing a given task, increasing the efficiency of the task-distribution system overall by governing the allocation of particular tasks to particular task-execution systems 108 according to the task-processing rules for that particular task and based on information about the performance capabilities of the task-execution systems 108. An task-processing rule also provides a way, for example, to determine the correctness of task results/solutions provided by the task-execution systems 108.

FIG. 4 shows one example of the task-execution system data 214 maintained by the task-execution system management module 208. It should be noted that although FIG. 4 shows a single table 400 comprising records (e.g., rows) for each task-execution system 108 a separate record/file can be stored for each task-execution system 108 as well. Also, embodiments are not limited to a table and other structures for storing data are applicable as well. Even further, one or more columns can be added and/or removed from the table 400 as well. The table 400 in FIG. 4 comprises a plurality of columns and rows, where each row is associated with a single task-execution system 108. A first column 402, entitled "ID", comprises entries 404 that uniquely identify a given task-execution system 108. A second column 406, entitled "Contact Info", comprises entries 408 including various contact information associated with the corresponding task-execution system 108. A third column 410, entitled "Qualifications", comprises entries 412 including various qualifications associated with a corresponding task-execution system 108. Qualifications can be, for example, geographic information, work history information (task related, previous task work performance information, and/or the like), performance characteristics of the task-execution system 108, etc.

A fourth column 414, entitled "Quality Rating", comprises entries 416 providing quality rating information for the task-execution system 108. It should be noted that the quality rating/metric can also be included under the "Qualifications" column 410 as well. As discussed above, the quality rating of a task-execution system 108 is assigned to a task-execution system 108 by the task-execution system management module 208 based on various factors such as previous task work performance (e.g., average task completion time, average correct results, etc.), duration of association with the task-distribution environment, and/or any other factor/metric that allows the task-execution system management module 208 to assign a weight, rating, or metric that represents the overall quality of a task-execution system 108. Information under the "Qualifications" column 410 can also be used to determine a quality rating for a given task-execution system 108. A fifth column 418, entitled "Work History", comprises entries 420 that include work history information associated with the task-execution system 108. Work history information can include information such as previous tasks participated in by the task-execution system 108, current tasks that the task-execution system 108 is participating in, average task completion time, average correct results, statistical information associated with the types of tasks the task-execution system 108 has participated in, and/or the like.

A sixth column 422, entitled "Reward History", comprises entries 424 including historical token information. This historical token information can indicate the overall token value earned by the computing device, average earnings per task, average earnings per unit of time, and/or any other historical or statistical information associated with tokens earned by the task-execution system 108. It should be noted that historical token information can be maintained by the task-execution system management module 208 and/or the token manager 118 of the token server 110. A seventh column 426, entitled "Security Credentials", comprises entries 428 including security information associated with the corresponding task-execution system 108.

Figure 5:
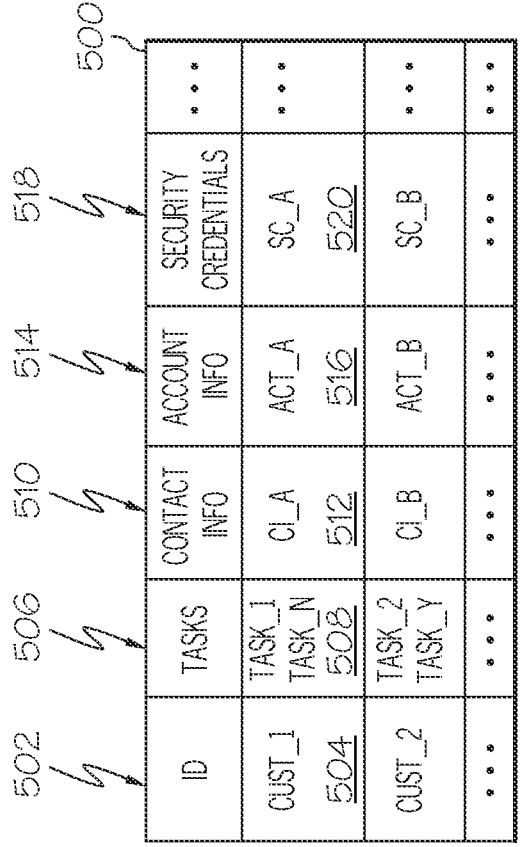
FIG. 5 is a table illustrating one example of task-requester data according to one embodiment.

FIG. 5 shows one example of the task-requester data 216 maintained by the task-distribution management module 112. It should be noted that although FIG. 5 shows a single table 500 comprising records (e.g., rows) for each task-requester system 106, a separate record/file can be stored for each task-requester system 106 as well. Also, embodiments are not limited to a table and other structures for storing data are applicable as well. Even further, one or more columns can be added and/or removed from the table 500 as well. The table 500 in FIG. 5 comprises a plurality of columns and rows, where each row is associated with a single task-requester system 106. A first column 502, entitled "ID", comprises entries 504 that uniquely identify a given task-requester system 106. A second column 506, entitled "Tasks", comprise entries 512 that include at least the task ID of each task associated with the task-requester system 106. These tasks can be previously completed tasks, currently scheduled/distributed tasks, and tasks waiting to be distributed. A third column 510, entitled "Contact Info", comprises entries 508 including contact information associated with the corresponding task-requester system 106. Contact information can include the name, address, phone number, email address, IP address, etc.

A fourth column 514, entitled "Account Info", comprises entries 516 including account information associated with the task-requester system 106. This account information can include payment information if a task-distribution environment provided by the server 102 requires a subscription. The account information can also include account balance information for payment of tokens to task-execution systems 108. The account information can further include token history information such as overall token payouts, payouts to specific task-execution systems 108, average payout per task, and/or the like. A fifth column 518, entitled "Security Credentials", comprises entries 520 including security information associated with the corresponding task-requester system 106. Security credentials can include a username, password, security questions, and/or the like.

As discussed above, task-requester systems 106 interact with the task-distribution management server 104 to create and manage tasks. To create or manage a task, the task-requester system 106 interacts with the task-distribution management server 104 via the interface 116 (or programmatically via one or more APIs). In one embodiment, the task-requester system 106 accesses an authentication interface to provide log-in credentials for accessing the task-distribution environment of the server 104. During registration the task-requester system 106 can provide information such as desired ID (identifier), password, contact information, payment information (if the task-distribution environment requires payment to be used), and the like. This registration is stored in the task-requester data 216 discussed above with respect to FIG. 5. Once authenticated, the task-requester system 106 may be provided with various templates. The task-requester system 106 may display such templates in a user interface in order to solicit user input, or it may simply provide a task request in accordance with the templates. It should be noted that a similar registration process is applicable to task-execution systems 108 as well.

Figure 6:
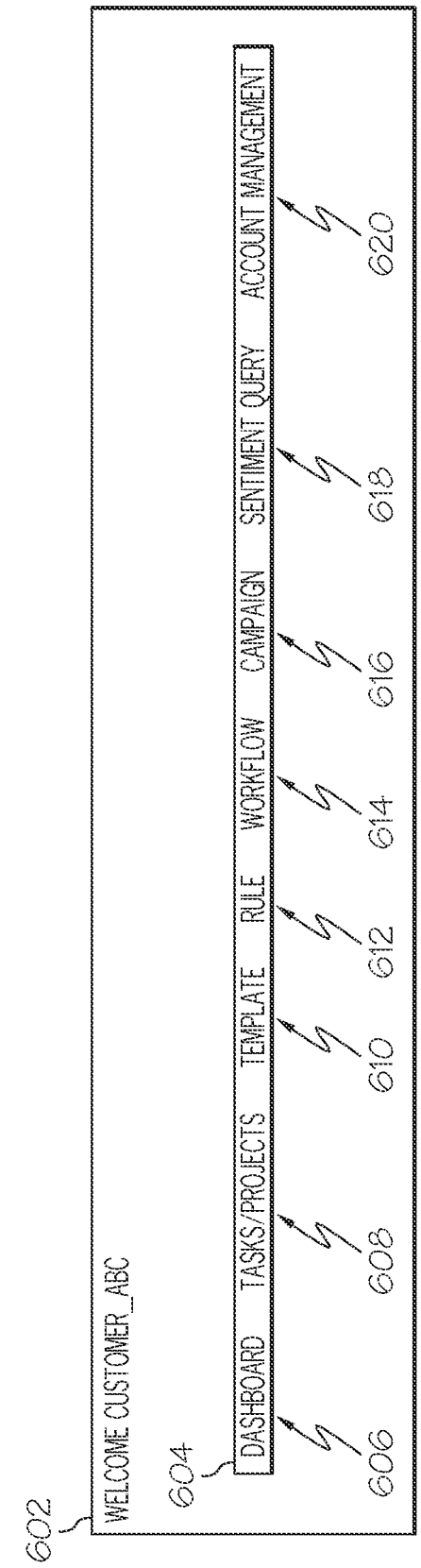
FIG. 6 shows one example of a user interface provided to a task-requester system of a task-distribution environment according to one embodiment.

FIG. 6 shows a first user interface 602 that can be displayed by task-requester system 106 after logging into the server 102. This user interface 602 comprises a menu 604 that includes various menu items that enable one or more actions. For example, a first menu item 606 provides a view of a dashboard or notification area. A second menu item 608 may enable creation of a task/project to be presented to one or more task-execution systems 108 of a crowd environment. A third menu item 610 may enable creation or selection of templates/user interfaces that a task-execution system 108 will optionally interact with when participating in a given task. This menu item 610 may enable specification or creation of templates/user interfaces that will be provided to a task-execution system 108 when being notified of a new task/project, acceptance of a task result, and/or rejection of a task result. A fourth menu item 612 may enable specification or creation of task-processing rules for managing task results. A fifth menu item 614 may enable management or creation of task workflows from a single task or from multiple tasks. A sixth menu item 616 may enable management or creation of workflow campaigns, which are based on interconnected task workflows and their results. A seventh menu item 618 may enable management or creation of sentiment campaigns, which comprises tasks related to brand sentiment. An eighth menu item 620 may enable management of the account.

Figure 7:
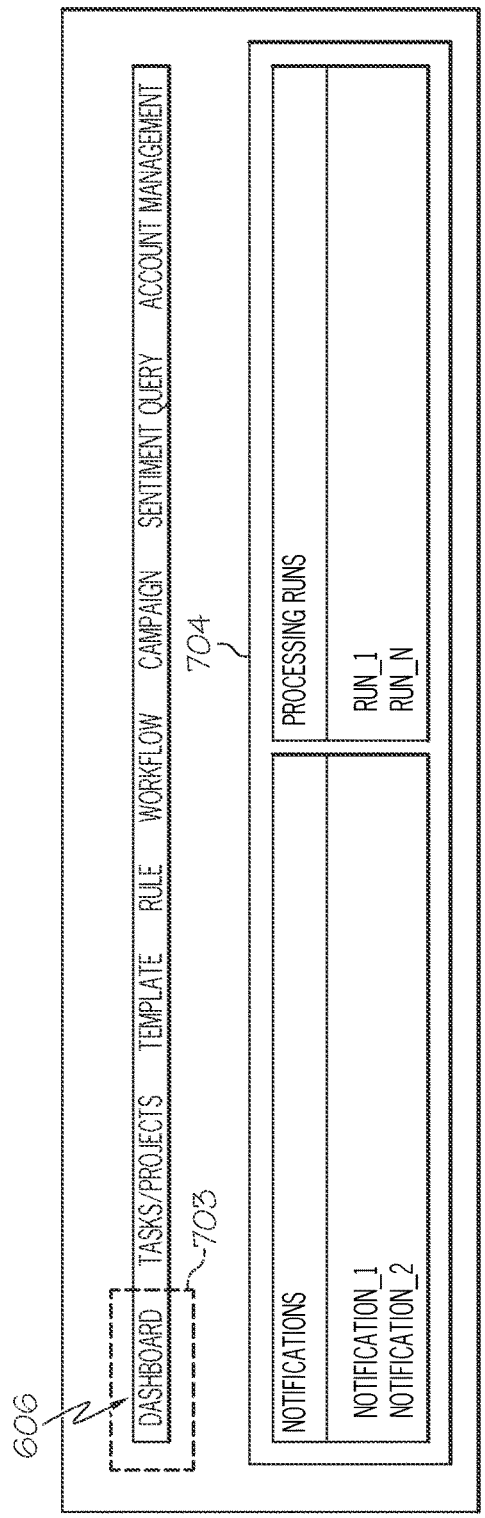
FIG. 7 shows one example of a user interface provided to a task-requester system of a task-distribution environment according to one embodiment.

FIG. 7 shows one example of a user interface that may be displayed when the first menu item 606 is selected, as indicated by the dashed box 703. In this example of FIG. 7, the user interface 702 comprises a dashboard or notification area 704. This area 704 shows any significant events that are occurring within the system 102. Events such as system failures, paused runs, newly created campaigns, etc. can be displayed in this area 704. Also, any campaign runs that are currently processing or that are in a paused state can be shown in this area 704 as well.

Figure 8:
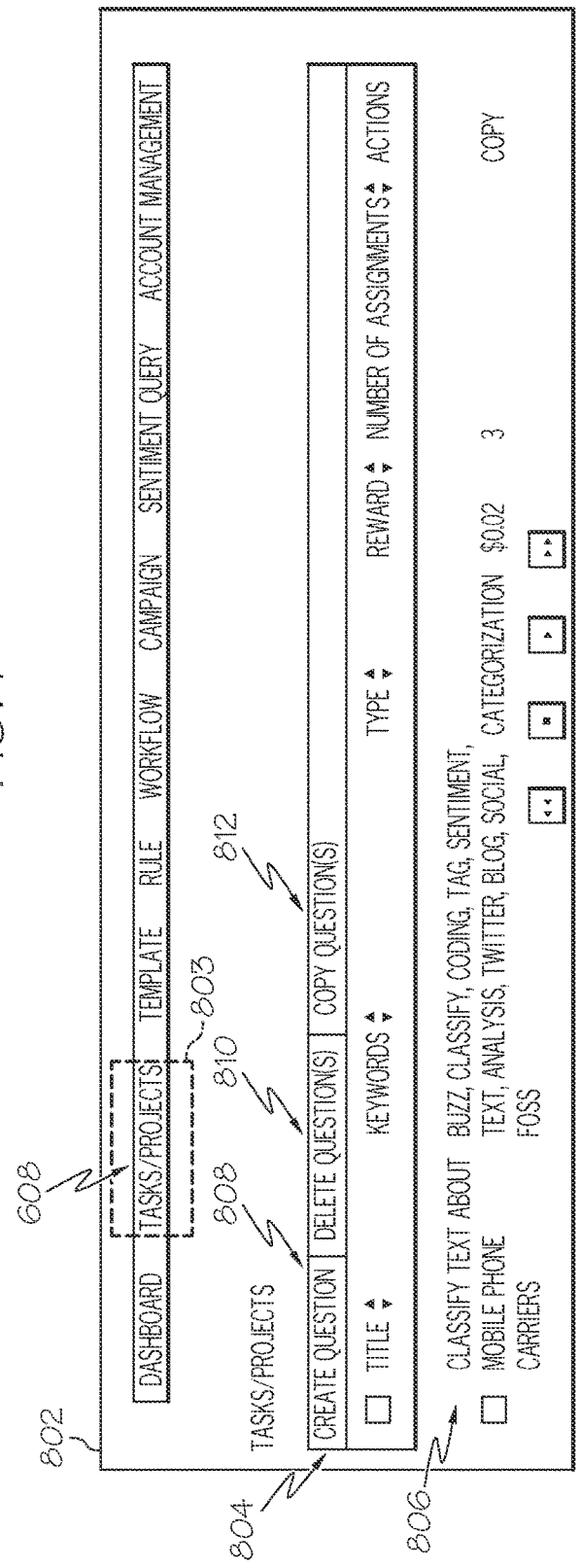
FIG. 8 shows one example of a user interface provided to a task-requester system of a task-distribution environment according to one embodiment.

FIG. 8 shows one example of a user interface presented when a selection of the second menu item 608 associated with tasks, as indicated by the dashed box 803, is received. In this example, the user interface comprises one or more views 802 that comprise a sub-menu 804 and a task display area 806. The sub-menu 804 comprises various actions that can be performed with respect to tasks. For example, a first action item 808 may enable creation of one or more tasks. A second action item 810 may enable deletion of one or more existing tasks. A third action item 812 may enable copying of one or more tasks to more quickly create additional tasks.

The task display area 806 lists the various tasks associated with the task-requester system 106. These tasks can be current tasks, completed tasks, future tasks, etc. The task display area 806, in one embodiment, can display task information such as title, keywords, task type, token, number of assignments, and actions. This task information can be retrieved from the task data 212 discussed above. The displayed tasks can be sorted based on any of the task information presented in the task display area 806.

As discussed above, the user interface may enable selection of an option on the view 802 to create/add a task (or project comprising multiple tasks). When the option is selected, the template module 204 may provide one or more templates for creating a task(s). FIG. 9 shows a user interface 902 comprising a template 904 for creating a task. This template 904 comprises a menu 906 that may enable access to various templates associated with the creation of a task. For example, the user interface may enable selection of a first set of templates 908 associated with specifying properties of a task, a second set of templates 910 associated with the results/answers to be provided by task-execution systems 108 when participating in the task, a third set of templates 912 associated with qualifications and rules of the task, a fourth set of templates 914 associated with notifications for the task, and a fifth set of templates 916 associated with providing advance options for the task. Additional templates can be added as well.

FIG. 9 further shows one example of the first set of templates 908 that is associated with entering properties of a task. This template 908 comprises a first input field 918 that may enable entry and/or selection of a task name. A second input field 920 may enable entry and/or selection of a task title. A third input field 922 may enable entry of a description of the task. A fourth input field 924 may enable entry of a set of keywords to be associated with the task. A fifth input field 926 may enable entry and/or selection of a task type, such as (but not limited to) Categorization, Rank, Moderation, Validation, etc., that is to be associated with the task. A sixth input field 928 may enable entry and/or selection of a token to be given to a task-execution system 108 for completing the task. A seventh input field 930 may enable entry and/or selection of the maximum and/or minimum number of task-execution systems 108 that are allowed to participate in the task or be notified of the task. It should be noted that there may or may not be a requirement to provide all of the above information for a task. Once the template has been completed, the information may be saved. The task management module 202 stores this information in the task data 212 discussed above.

Figure 10:
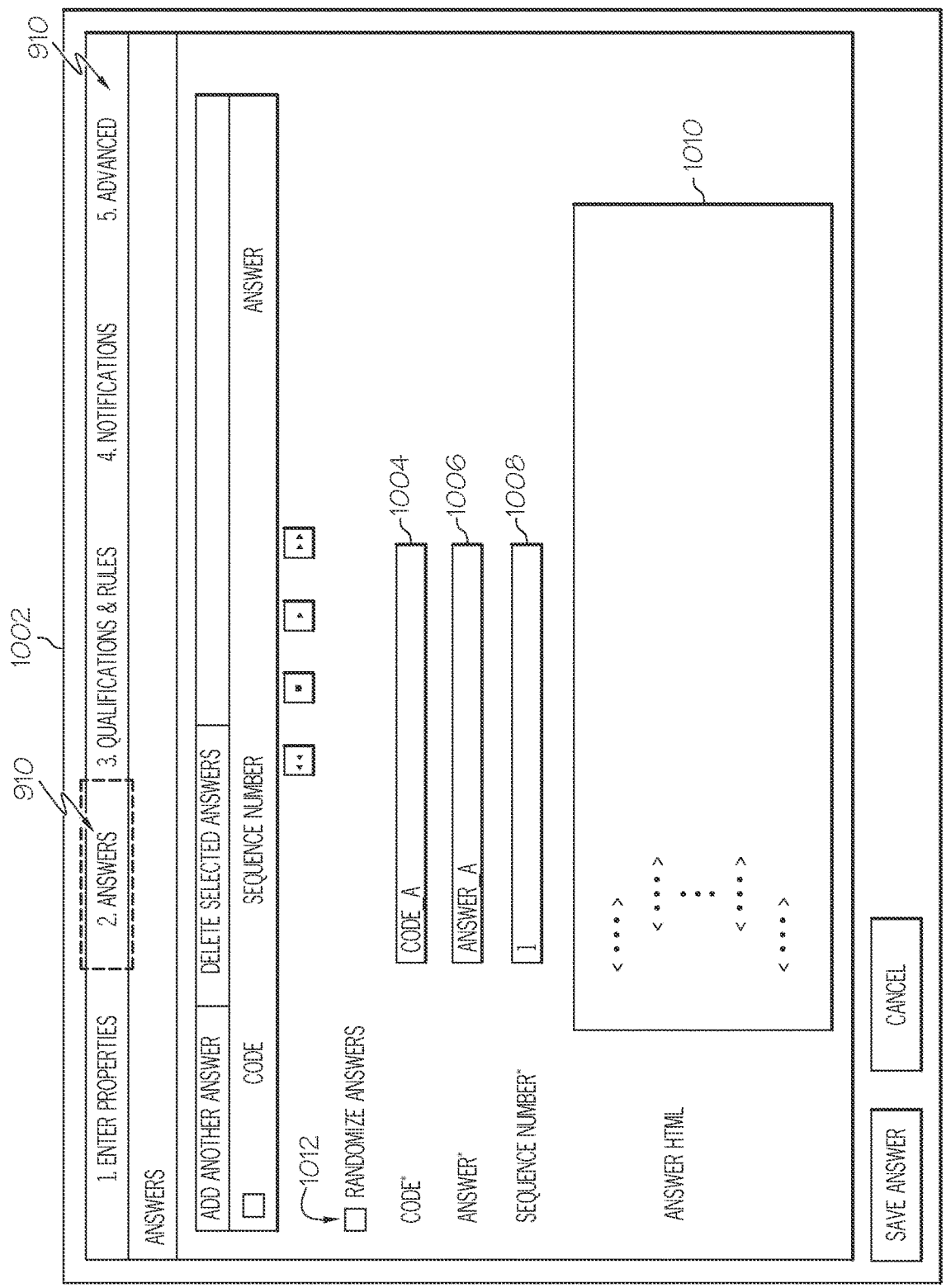
FIG. 10 shows one example of a template for providing results/answers for a task for selection by a task-execution system in a task-distribution environment according to one embodiment.

FIG. 10 shows one example of a user interface 1002 displaying the second set of templates 910, which allow creation of possible results/answers to a task(s) (or delete previously created results/answers). These results/answers can be used by the task-processing rule module 206 to validate results/answers received from task-execution systems 108. These results/answers can also be presented to task-execution systems 108 to inform them of the results/answers of a task that are expected. The template 910 of FIG. 10 comprises a first input field 1004 that may enable provision of code. The code may be used within templates and resulting reports as representations of the values that are used mostly in integration scenarios. For example, Sentiment Answer "Positive" can have codes of "POS" and "P". A second input field 1006 may enable provision of a result/answer definition. The answer represents what can be visible to the user in case an HTML form (or any other type of form) is not needed. A third input field 1008 may enable specification of a sequence number for the result/answer. This sequence number is used by the task-distribution management module 112 to display the result/answer in a specific order/position based on the sequence number when there are multiple results/answers. The template 910 also provides an area 1010 that may enable entry of code such as (but not limited to) markup language code representing the result/answer. For example, one can color code the value of Positive to be of green color or value of Negative to be in red. Another example can be Ajax-based components that integrate with task-requester systems for possible display options. Other options such as, but not limited to a randomization option 1012 (for randomizing the order of multiple results/answers when presented to a task-execution system 108) can also be provided in this template 910. The task management module 202 associates the result/answer information entered into the template 910 to the given task and can also store this information within the task data 212 as well.

FIG. 11 shows one example of a user interface 1102 displaying the third set of templates 912 that are associated with qualifications and rules of the task. A first input field 1104 may enable entry of a customized task-processing rule (e.g., acceptance criteria) and/or select from a set of predefined rules. As discussed above, task-processing rules determine the correctness or validity of task results. One example of an task-processing rule is as follows: initially assign a task to 4 task-execution systems 108 and if 80% of these task-execution systems 108 do not agree (e.g., provide the same results) then extend the assignment by 1 until an 80% agreement is reached. As can be seen, an task-processing rule can be used to provide the best possible solution to a task or at least provide a given degree of accuracy or confidence of a result while using resources (e.g., task-execution systems 108) in an efficient manner.

A second input field 1106 shown in FIG. 11 may enable creation and/or selection of qualifications. These qualifications instruct the task-execution system management module 208 as which task-execution systems 108 can be allowed to participate or be notified of the associated task. As discussed above, qualifications can be geographic requirements, previous work history requirements (task related), previous task work performance, performance characteristics of the task-execution system 108, and/or the like. The task management module 202 stores this information in the task data 212 discussed above.

FIG. 12 shows one example of a user interface 1202 displaying the fourth set of templates 914 that are associated with task notifications. A first input field 1204 may enable entry and/or selection of one or more templates/user interfaces when a task-execution system 108's result/answer is accepted (validated) by the task-distribution management server 104. A second input field 1206 may enable entry and/or selection of one or more templates/user interfaces when a task-execution system 108's result/answer is rejected (identified as being incorrect) by the task-distribution management server 104. A third input field 1208 may enable entry and/or selection of one or more templates/user interfaces for notifying the task-execution system 108 of a published/distributed task (or project, workflow, campaign, etc.). The task management module 202 stores this information in the task data 212 discussed above.

FIG. 13 shows one example of a user interface 1302 displaying the fifth set of templates 916 that may enable entry/selection of advanced options for a task. A first input field 1304 may enable entry/selection of an address such as a uniform resource locator to be associated with the task/project. This address is where the task/project is rendered for participation by task-execution systems 108. A second input field 1306 may enable entry/selection of a time interval for the task/project. This time interval sets a maximum amount of time that a task-execution system 108 has to complete a given task. A third input field 1308 may enable entry/selection of an amount of time in which the given task or project expires. A fourth input field 1310 may enable specify a period of time during the day/night in which the task is available working on. A fifth input field 1312 may enable specification of a given time period in which the task-distribution server 104 is to approve a task-execution system 108's results. This is used for presentation purposes and represents the space allocated on the user interface for the Tasks of a specific kind.

Figure 14:
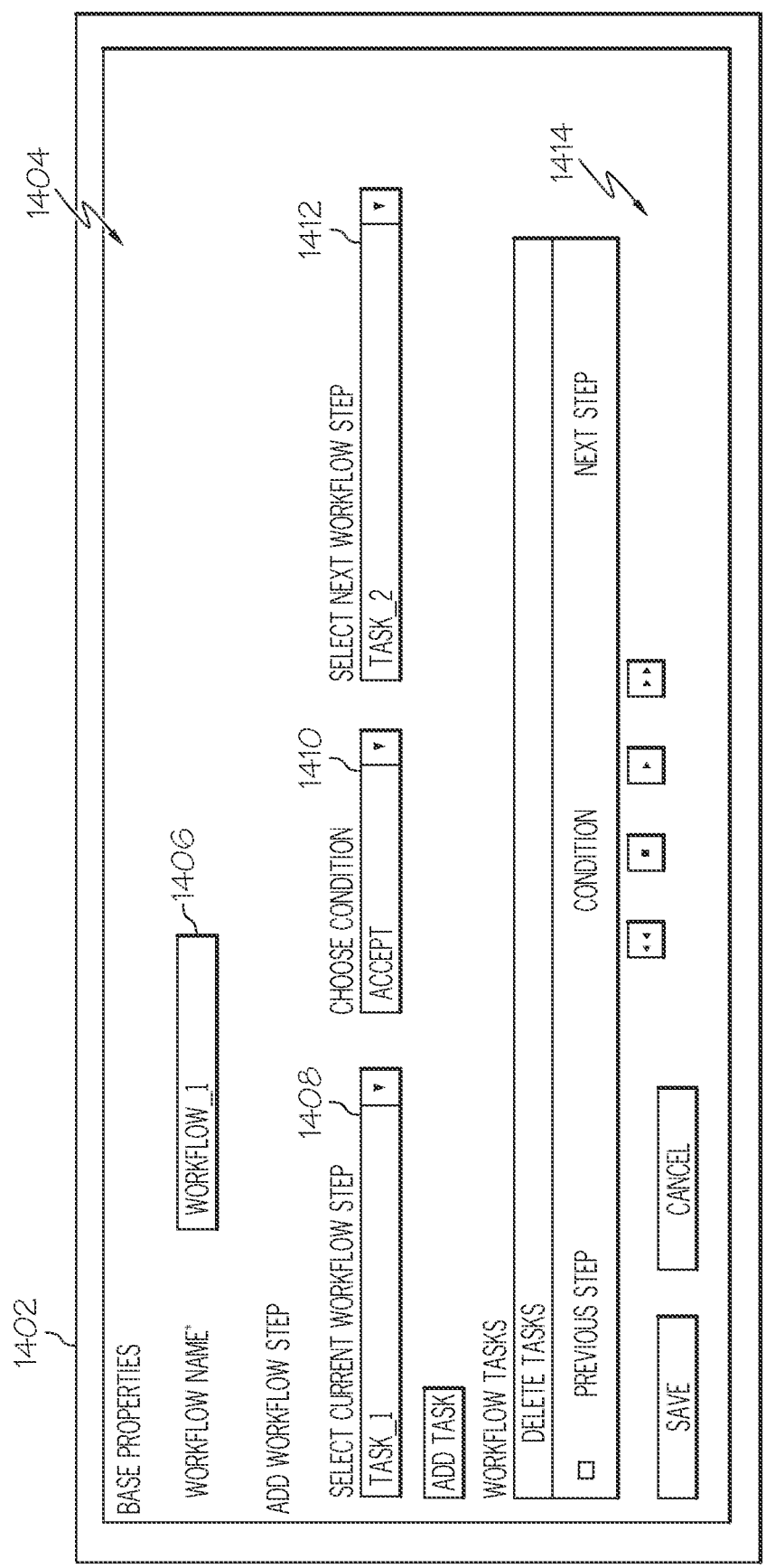
FIG. 14 shows one example of a template for creating a task workflow in a task-distribution environment according to one embodiment.

After the information is provided as discussed above with respect to FIGS. 7-13 or otherwise, the task-distribution management module 112 may save this information in the task data 212. The task management module 202 then generates a task or plurality of tasks (e.g., a project) from the provided information and associates this task with the task-requester system 106 in the task-requester data 216. In addition to creation of a single task or project, various task workflows may also be created by selecting the workflow menu item 614 from the menu 604 show in FIG. 6. FIG. 14 shows one example of a user interface 1402 comprising a template 1404 that may enable creation of task workflows from a single task or from multiple tasks. In one embodiment, micro- and/or macro-workflows may be created. A micro-workflow takes a set of one or more tasks and couples this set to at least one other set of one or more tasks. In a micro-workflow, once the task-execution system 108 has generated a result for each task within a first task, the task-execution system 108 moves on to the next set of tasks until the workflow is completed.

A macro-workflow or campaign comprises use cases that can be tied together and have intermediate results that can be considered interim between running campaigns. These use cases are customizable based on the response. Stated differently, a macro-workflow comprises a set of one or more tasks that are coupled to at least one other set of one or more tasks where the results of one set of tasks are used to determine which part of the workflow is presented to the task-execution system 108 next. This allows for breaking a complex task into simpler sub-tasks. The template 1404 shown in FIG. 14 comprises a first input field 1406 that may enable specify a name for a current workflow. A second input field 1408 may enable specify a workflow step. A third input field 1410 may enable specify a condition. A fourth input field 1412 may enable specify the next workflow that is presented to the task-execution system 108 if the condition(s) is satisfied. When interacting with the second input field 1408 or the fourth input field 1412 the field may be pre-populated with tasks or projects that have been previously created. The user interface may enable selection of a task or project from this list. The user interface may then enable entry or selection of one or more conditions that need to be met with respect to the selected task(s) in order for the task-execution system 108 to be allowed to advance to the next workflow step specified in the fourth input field 1412. Conditions can include a requirement that the result for the task specified in the second input field 1408 be accepted (validated as being a correct result), a requirement that the result of the task be rejected, etc. Conditions are for workflow splits and joins. For example, conditions are rule based and determine how data is being split into workflow activities and then being combined back into resulting dataset.

The user interface may then enable saving the information entered into the second, third, and fourth input fields 1408, 1410, and 1412 as a workflow task for the current workflow being created. These workflow tasks can then be displayed in a display area 1414. A similar process can be performed for creating a macro-workflow (e.g., a campaign) where multiple workflows can be coupled together. It should be noted that when a task is selected to be part of a workflow, the task management module 202 updates the task data 212 for this task to reflect its association with the workflow.

In addition to the above templates, various other templates (not shown) can be presented. For example, a set of templates that may enable creation or selection of a template that will be provided to a task-execution system 108 when participating in a task or as part of a task notification. In these templates, code may be entered, or location information may be provided that allows the data integration module 210 to extract task-requester data from storage to provide to a task-execution system 108 during task participation. This information can be the data on which the task is to be performed or data that helps the task-execution system 108 perform a task. Another set of templates can be presented that may enable create and store task-processing rules. A set of templates for creating a sentiment query for a sentiment analysis task may also be presented. This template may enable specify various web-based information sites or information types, such as (but not limited to) blogs, blog comments, boards, UseNet, video, social networking sites, etc., from which to retrieve data from. The template may enable provision of keywords, language requirements, data requirements, a total number of articles/snippets to retrieve, etc. Based on this information, the task-distribution management module 112 may retrieve data, such as articles, that are to be provided to a task-execution system 108 as part of a sentiment analysis task.

In addition to the templates and user interfaces discussed above, the user interface may also present various reports associated with an individual task, a group of tasks (e.g., a project of tasks), a workflow, campaign, task-execution system 108, etc. Reports may be displayed any time during the life of the task, project, workflow, or campaign or after completion thereof. These reports can include statistical information such as average cost, best and worst task (tasks that require the least amount and most amount of re-assessment by the task-processing rule module), best and worst task-execution systems 108, the distribution of answers for questions with fixed answers per run/campaign, the distribution of scenarios involving re-assessment by the task-processing rule module (e.g., 80% were 2 for 2, 20% were 2+1, etc.), etc.

Other examples of information that can be provided in reports is the number of task-execution systems 108 that participated in a task (or workflow, campaign, etc.) along with the results provided by the task-execution system 108; total token value earned by task-execution systems 108 per a unit of time; all results submitted by an individual task-execution system 108 or all task-execution systems 108 including all results of all tasks of a multi-task project; lifetime task-execution system statistics or statistics for one or more given tasks including accuracy of results (e.g., accuracy measurements such as number of results accepted, number of results rejected, etc.); task-execution system quality rating; task-execution system compensation; task-execution system earnings; task-execution system bonuses; best/worst qualifications of the task-execution system and types of hits (e.g., the task-execution system is good at categorization, task-execution system has sub-par performance in address validation, etc.); etc. In addition, a report can be provided that displays a task(s) as seen by the task-execution systems 108 along with the results provided by task-execution systems 108 overlaid thereon.

FIG. 15 shows one example of a summary report 1502 for a particular workflow. It should be noted that similar information can be displayed for a single task, project, and/or campaign as well. The report 1502 shown comprises a first area 1504 that displays task-execution system statistics such as the total number of task-execution systems 108 that participated, and the total number of tokens paid out. The report 1502 comprises a second area 1506 that comprises submission data such as the number of successful submissions (e.g., results/answers) by the task-execution systems 108, the number of failed or incorrect submissions, submissions that require review, submissions that are pending approval, and average price per submission (average token value per submission). A third area 1508 lists the best task-execution systems 108 (e.g., the top X task-execution systems 108) that participated in the workflow. Information such as task-execution system ID, result/answer accuracy, average time spent per task (average task completion time), token amount, token bonus, etc. can be displayed. A fourth area 1510 identifies the best and worst tasks (if applicable) with respect to re-assessment by the task-processing rule module, result/answer accuracy, time spent to submit a result/answer by task-execution systems 108, etc.

Figure 16:
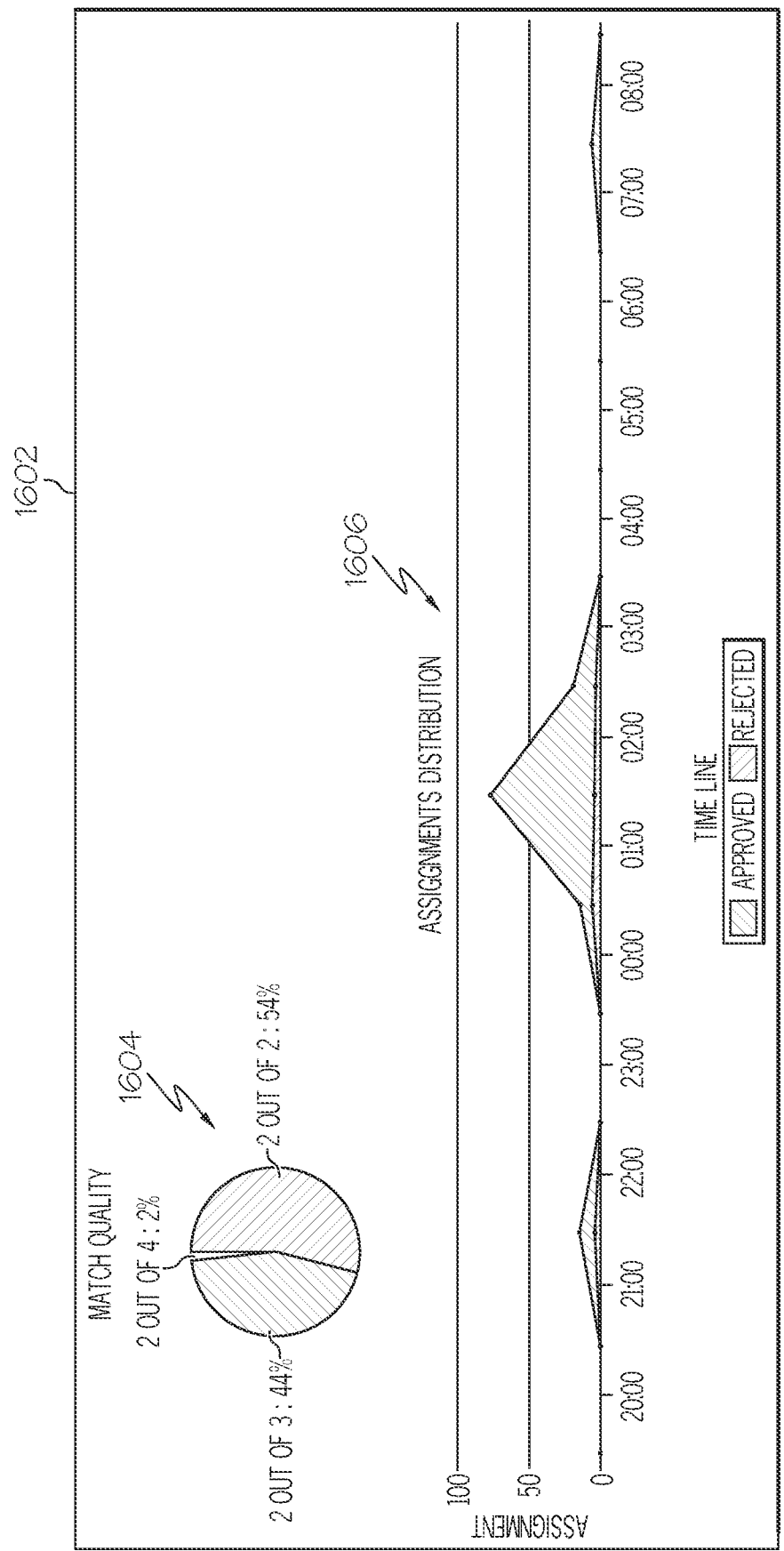
FIG. 16 shows one example of a report displaying task result information in a task-distribution environment according to one embodiment.

FIG. 16 shows one example of a results report 1602 for a particular workflow. It should be noted that similar information can be displayed for a single task, project, and/or campaign as well. It should also be noted that the formats shown in FIG. 16 for presenting the information are only examples and other formats are applicable as well. The report 1602 shown in FIG. 16 comprises a first area 1604 that provides match quality information. This match quality information shows the percentage of task result submissions that had a 2 out of 2 match, a 2 out of 3 match, and a 2 out of 4 match. A second area 1606 comprises assignment distribution information. This information shows the number of assignments for the workflow, the time of the assignments, and approval/rejection distribution of the task-execution system response with respect to the number of assignments and assignment time. The results report 1602 can include additional information such as the ID of each task in the workflow; the ID of task-execution systems 108 that participated in each of the tasks; the results submitted by the user for each task; the acceptance state (accepted or rejected) of each of these results; information associated with the data on which the corresponding task was performed on; etc.

The match quality portion of FIG. 16 demonstrates plurality distribution. For example, this chart can be analyzed for anomalies such as underpriced or erroneous tasks. The match quality chart can be analyzed to determine, for example, if there were too many high assignment cases, e.g., 2 out of 4, as this lowers the confidence in quality results and unnecessarily increases the cost (which can be an indication of poorly constructed tasks or bad quality controls).

Figure 17:
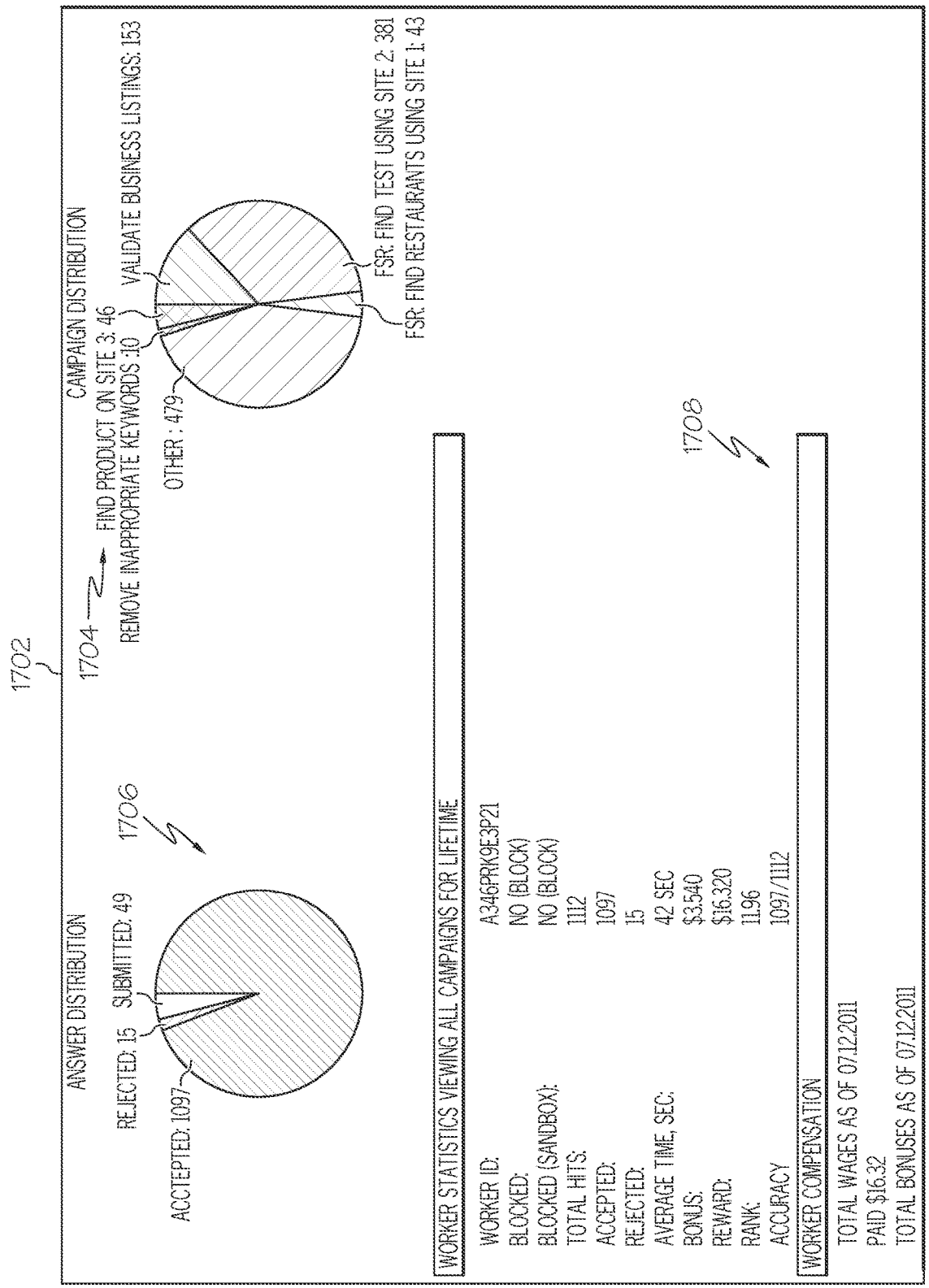
FIG. 17 shows one example of a report displaying information associated with a task-execution system in a task-distribution environment according to one embodiment.

FIG. 17 shows one example of a report 1702 for a given task-execution system. The report 1702 shown in FIG. 17 provides information about the task-execution system over the overall period of deployment of the task-execution system. Similar reports can be generated for a single task, a group of tasks, a workflow(s), campaign(s), etc. It should also be noted that the formats shown in FIG. 17 for presenting the information are only examples and other formats are applicable as well. This report 1702 comprises a first area 1704 providing answer distribution information. As can be seen from FIG. 17, this task-execution system submitted 49 results that have not been accepted/rejected, submitted 15 results that have been rejected, and has submitted 1097 results that have been accepted.

A second area 1706 comprises distribution information associated with campaigns, tasks, workflows, etc. In this example, the task-execution system has participated in 43 food service reports (FSR) for finding restaurants using Site_1. The task-execution system has also participated in 381 FSRs for finding restaurants using Site_2. The task-execution system further participated in 153 business listing validation tasks. FIG. 17 also shows that the task-execution system also participated in 46 tasks for finding products on Site_3; 10 tasks for removing inappropriate keywords; and 479 other tasks. A third area 1708 within the report 1702 provides statistical information such as the total number of tasks participated in by the task-execution system, the total number of accepted results, the total number of rejected results, the average time spent on each task, token bonus information, total token accumulation, rank (e.g., quality rating of a specific task-execution systems 108 as compared to other task-execution systems 108), and an accuracy ratio (e.g., the ratio of total number of submitted results and the total number of accepted results.

Figure 18:
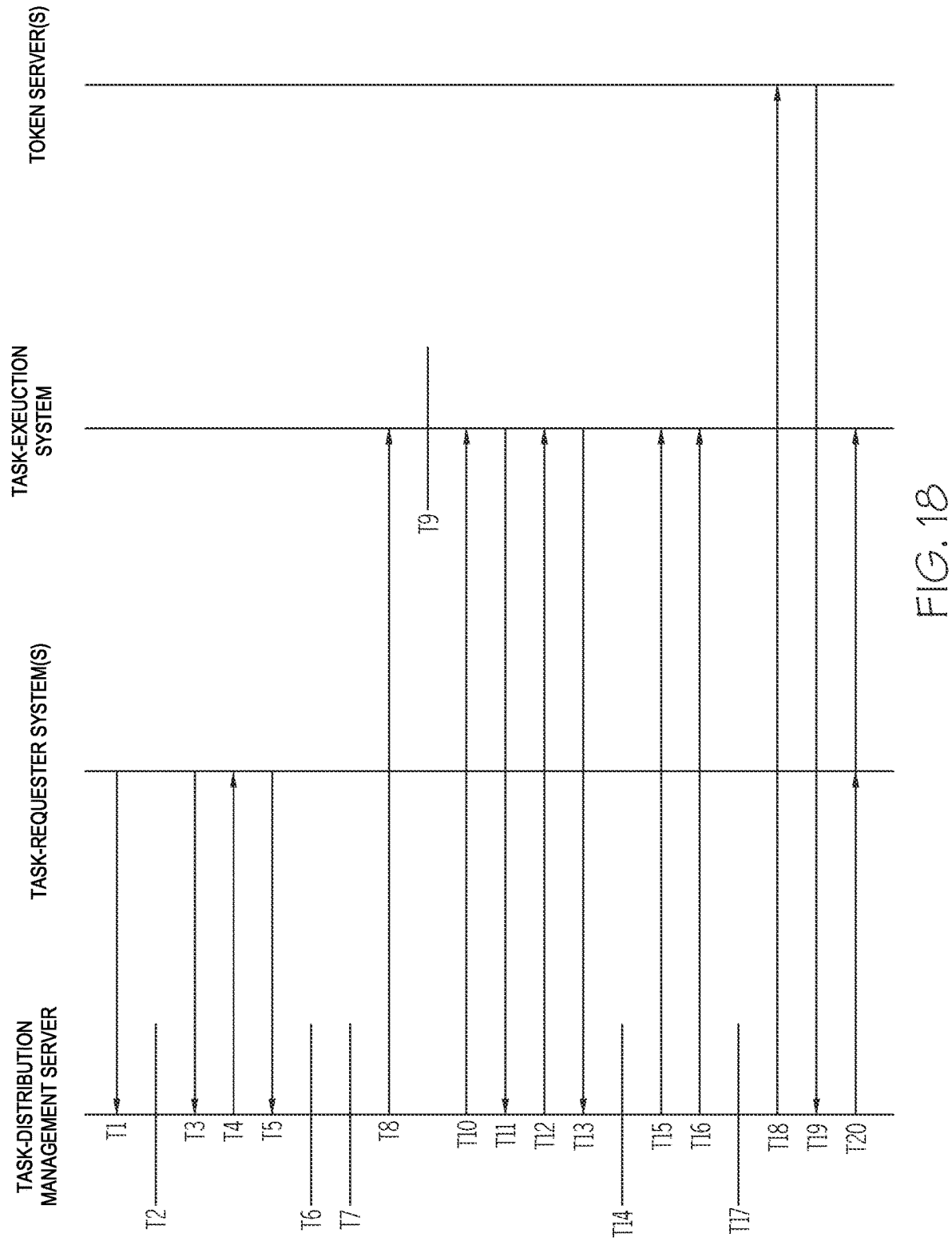
FIG. 18 is a transactional diagram illustrating one example of an overall process for managing a task-distribution environment according to one embodiment.

FIG. 18 is a transactional diagram illustrating one example of managing a task-distribution environment according to one embodiment. It should be noted that embodiments are not limited to the sequencing shown in FIG. 18. At T1, a task-requester system 106 registers with the task-distribution management server 104. At T2, a set of task-requester data 216 is created as discussed above with respect to FIG. 5. At T3, an option for creating a task may be selected. At T4, the template management module 204 of the task-distribution management module 112 provides one or more user interfaces/templates for creating a task. At T5, the information requested by the template/user interface for creating a task is provided, as discussed above with respect to FIGS. 3 and FIGS. 8-13. At T6, the task management module 202 then stores this task information within the task data 212 and generates a task therefrom. At T7, the task management module 202 analyzes the task and associated task data 212 to determine if any qualifications/requirements of the task-execution system and task requirements are associated therewith. As discussed above, task-execution system qualifications/requirements can indicate, for example, that only task-execution systems 108 associated with a given quality rating are to be notified of the given task. Task requirements can be scheduling requirements, requirements regarding the number of task-execution systems 108 allowed to participate in the task, etc.

At T8, the task management module 202 publishes/advertises the task (or project, workflow, campaign, etc.) based on the identified task-execution system qualifications/requirements and task requirements. For example, based on the task-execution system qualifications/requirements, the task-execution system management module 208 identifies task-execution systems 108 that satisfy these qualifications/requirements and notifies the task management module 202 of these identified task-execution systems 108. The task management module 202 proceeds to only notify these task-execution systems 108 of the task. Notification can include sending a message (e.g., email, short messaging service message (SMS), instant message, social networking message, etc.) to the selected task-execution systems 108. Notification can also include sending a message to the task-distribution account (corresponding to the selected task-execution systems 108) on the server 104 or providing the task information in a display area for available tasks in one or more user interfaces. It should be noted that if no task-execution system qualifications/requirements are specified, then the task can be distributed to any set of task-execution systems 108. In addition, one or more tasks can be published as an advertising campaign that advertises the task along with its description, requirements, tokens, etc. The advertising campaign can be published or otherwise made available to the task-execution systems 108 using the task-distribution environment, a blog, a website, a text message, an email message, and a social media site, an application programming interface, and/or the like.

One or more task-execution systems 108 receive the notification and logs into the task-execution system account at the server 104, at T9. In another example, the task-execution system does not receive the notification until the task-execution system logs into the task-execution system account at the server 104. At T10, the task management module 202 provides the task-execution system with available tasks. At T11, the task-execution system task is selected. The task-distribution management module 112 provides one or more user interfaces/templates to the task-execution system for performing the actions required by the task, at T12. As discussed above, the template manager 204 generates or retrieves these user interfaces/templates based on the task data 212 associated with the task. When creating a task, a template can be selected or created in order to be provided to a task-execution system for working on a task. Data source information may also be provided so that the data integration module 210 can retrieve the data for which the task-execution system is to perform the task on.

FIG. 19 shows one example of the user interface/template presented to the user for participating in a task. For example, FIG. 19 shows a template 1902 that provides a set of task instructions 1904 identifying the actions to be performed by the user. The template 1902 also provides the data 1906 upon which the actions are to be performed. The task-execution system is also provided with a set of task results 1908 to select based on the data. In the example of FIG. 19, the task-execution system these tasks results are sentiment categories for a brand sentiment.

Returning to FIG. 18, when the task-execution system has completed the task, the task-execution system submits the results to the task-distribution management module server 104, at T13. AT T14, the task-processing rule module 206 compares the task-execution system's results for the task to one or more predefined or validated results and/or applies one or more task-processing rules (acceptance criteria) to the task-execution system's results. Based on this process, the task-processing rule module 206 either accepts or rejects the task-execution system's submission and notifies the task-execution system accordingly, at T15. Depending on the rules setup, if the task-execution system's submission is rejected, or if the task-processing rule module 206 determines that additional results from additional task-execution systems 108 is necessary to satisfy the rules, the task management module 202 can optionally assign one or more additional task-execution systems 108 to the task, at T16.

At T17, the task management module 202 determines that the task has been completed. This determination can be based on a number or threshold of correct results being received, a time period having expired, an indication to end the task, etc. At T18, the task-execution system management module 208 identifies all of the task-execution systems 108 that submitted a correct result and notifies the token server 110 to provide the appropriate token to the task-execution systems 108. It should be noted that the token can be transmitted to task-execution systems 108 as soon as their results are determined to be correct and do not have to wait until the task has been deemed completed/ended. The token server 110 can credit an account at the task-distribution management server 104 or send the token to a location designated. At, T20, the task-distribution management module 112 sends any applicable reports to the task-requester system 106 and/or the task-execution systems 108, as discussed above.

As can be seen from the above discussion, embodiments provide and manage task-distribution environments. One or more of these embodiments enables submission of task information to a task-distribution server 104. The task-distribution server 104 automatically generates a task from this information and manages the data required by the task, task-execution system selection, task-execution system task results, and task-execution system compensation. This may increase quality via an iterative approach as embodiments manage the process until a desired accuracy is achieved within allowed budgetary constraints. In addition, embodiments leverage previous results to simplify tasks requirements by either allowing task-execution systems 108 to retrieve previously collected data or avoid data points that require agreement. For example, two tasks can ask task-execution systems to find URL and phone number information for a business. In a first iteration the phone number is identified but not the URL. Therefore, embodiments can dynamically create a task that only asks task-execution systems to identify the URL. This reduces complexity and may reduce level of compensation. In another example, a task can ask two or more questions in a single task (find phones for two companies). A first iteration can produce results for one company but not another company. Particular embodiments can then take such fall-outs and create a new task with two companies where agreement was not achieved. Such a process allows for cost reduction since only answers that do not have an agreement are being collected in multi-questions tasks.

Figure 20:
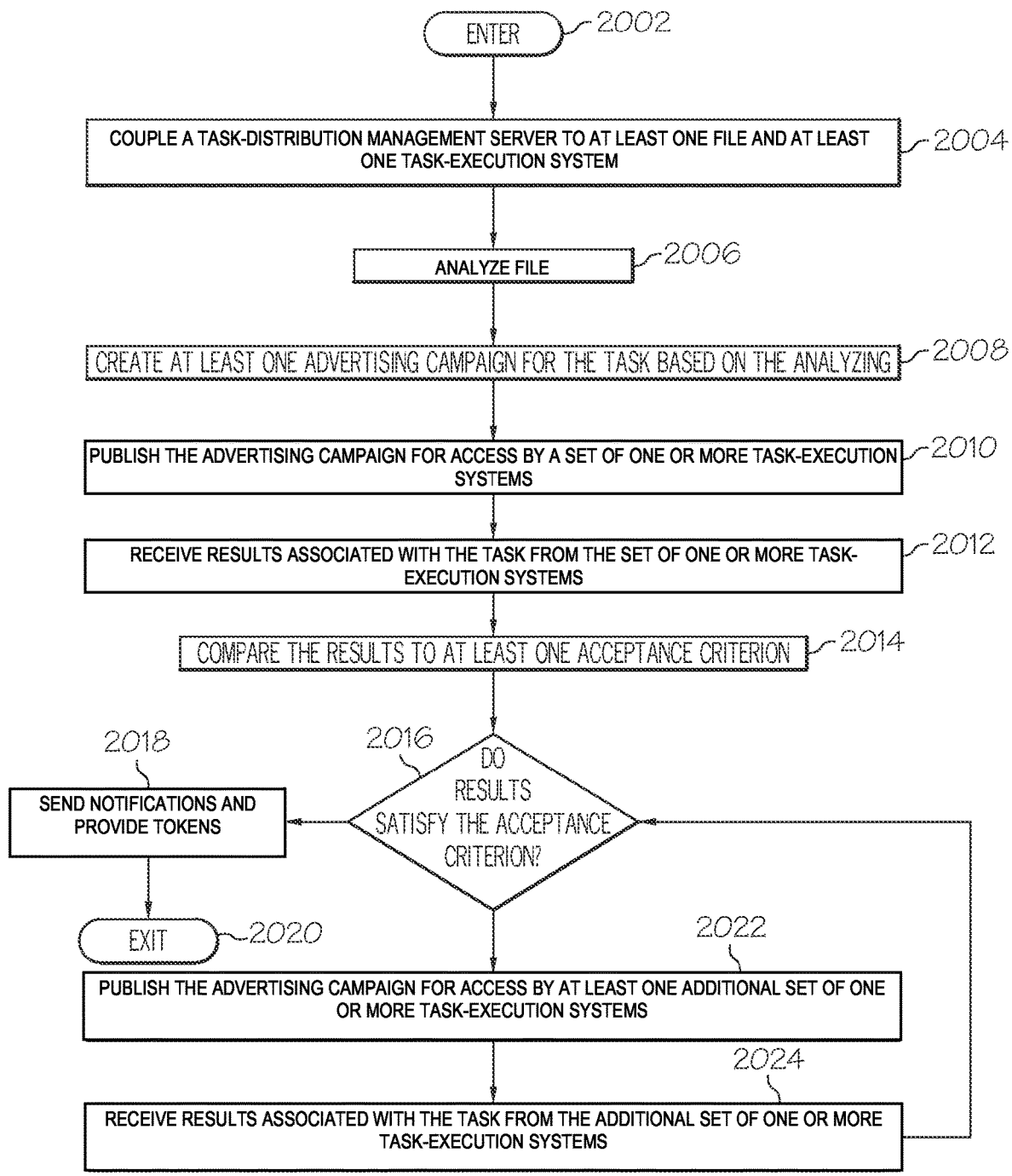
FIG. 20 is an operational flow diagram illustrating one example of an overall process for managing a task-distribution environment according to one embodiment.

FIG. 20 shows an operational flow diagram illustrating one example of managing a task-distribution environment. It should be noted that the steps of the operation flow diagram shown in FIG. 20 have already been discussed above in greater detail. The operational flow diagram of FIG. 20 begins at step 2002 and flows directly to step 2004. A task-distribution management server 104, at step 2004, is communicatively coupled over a telecommunications network to at least one file of task-requester data 216 (e.g., a database, application, computing system, etc.) and at least one task-execution system 108. The task-distribution management server 104, in one embodiment, is also communicatively coupled to at least one task-requester system 106 as well. The file of task-requester data 216 may comprise at least one task to be distributed. The file of task-requester data 216 can be one of a database, application, etc. that comprises a task associated with the task-requester system 106.

A task-distribution management module 112 at the server 104, at step 2006, analyzes the file of task-requester data 216 to identify at least a description of the task, a token to be given to task-execution systems 108 for completion of the task, and at least one acceptance criterion for accepting the task when completed. This information may be stored within the file of task-requester data 216. This information can also be stored separate from the file of task-requester data 216. Based on this analyzing, the task-distribution management module 112, at step 2008, creates at least one advertising campaign for the task. The task-distribution management module 112, at step 2010, publishes the advertising campaign for access by a set of one or more task-execution systems 108. It should be noted that after a given period of time, which may be pre-defined, the advertising campaign can be updated with a new token that can be offered. Also, the task-distribution management module 112 can determine that a given period of time has passed since the advertising campaign has been published and re-publish the advertising campaign to a new set of one or more task-execution systems. In one embodiment, this new set of one or more task-execution systems may be larger than the previous set of one or more task-execution systems.

The task-distribution management module 112, at step 2012, receives results associated with the task from the set of one or more task-execution systems 108. The task-distribution management module 112, at step 2014, compares the results to the at least one acceptance criterion. The task-distribution management module 112, at step 2016, determines if the results satisfy the acceptance criterion. If the result of this determination is positive, the task-distribution management module 112, at step 2018, sends notifications regarding the results and also notifies a token manager to provide the token(s). The control flow then exits at step 2020. If the result of the determination at step 2016 is negative, the task-distribution management module 112 can determine that additional resources, such as work provided by additional task-execution systems 108, are required to complete the task in a satisfactory manner. At step 2022, the task-distribution management module 112 publishes the advertising campaign for access by at least one additional set of one or more task-execution systems 108. The task-distribution management module 112, at step 2024, receives results associated with the task from the at least one additional set of one or more task-execution systems 108. The task-distribution management module 112 then repeats steps 2016 to 2024 until the acceptance criterion is satisfied by the tasks results submitted by the task-execution systems 108. Therefore, the acceptance criteria, in combination with the task distribution protocols of the task-distribution management module 112 may provide a way to limit the number of task-execution systems 108 involved in processing a given task, limit the use of bandwidth on the computing network and other systemic overhead involved in distributing tasks among the task-execution systems 108, and increase the efficiency of the task-distribution system overall by governing the allocation of particular tasks to particular task-execution systems 108 according to the acceptance criteria for that particular task and based on information about the performance capabilities of the task-execution systems 108.

Figure 21:
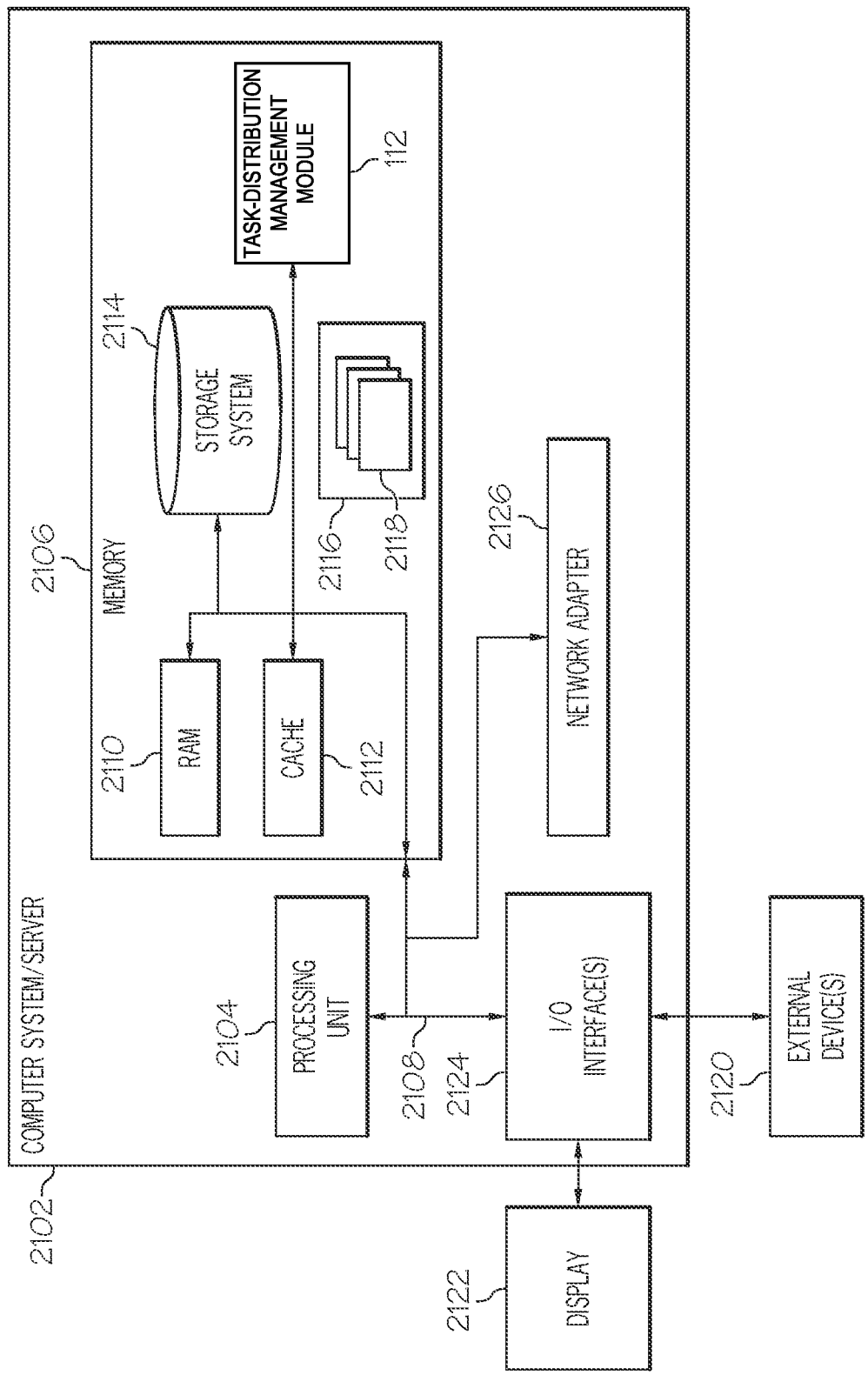
FIG. 21 illustrates one example of an information processing system according to one embodiment.

Referring now to FIG. 21, a schematic of an example of an information processing system, such as the server 104 of FIG. 1, is shown. Information processing system 2102 is only one example of a suitable system and is not intended to suggest any limitation as to the scope of use or functionality of embodiments of the invention described herein. Regardless, the information processing system 2102 is capable of being implemented and/or performing any of the functionality set forth hereinabove.

The information processing system 2102 can be a personal computer system, a server computer system, a thin client, a thick client, a hand-held or laptop device, a tablet computing device, a multiprocessor system, a microprocessor-based system, a set top box, a programmable consumer electronic, a network PC, a minicomputer system, a mainframe computer system, a distributed cloud computing system, or the like.

As illustrated in FIG. 21, the information processing system 2102 is shown in the form of a general-purpose computing device. The components of the information processing system 2102 can include, but are not limited to, one or more processors or processing units 2104, a system memory 2106, and a bus 2108 that couple various system components including the system memory 2106 to the processor 2104.

The bus 2108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The information processing system 2102 typically includes a variety of computer system readable media. Such media may be any available media that is accessible by the information processing system 2102, and it includes both volatile and non-volatile media, removable and non-removable media.

The system memory 2106, in one embodiment, comprises the task-distribution management module 112, its components, and the various data 212, 214, 216 as shown in FIG. 1. These one or more components can also be implemented in hardware as well. The system memory 2106 can include computer system readable media in the form of volatile memory, such as random access memory (RAM) 1010 and/or cache memory 2112. The information processing system 2102 can further include other removable/non-removable, volatile/non-volatile computer system storage media. By way of example only, a storage system 2114 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 2108 by one or more data media interfaces. As will be further depicted and described below, the memory 2106 may include at least one program product having a set (e.g., at least one) of program modules that are configured to carry out the functions of various embodiments of the invention.

Program/utility 2116, having a set (at least one) of program modules 2118, may be stored in memory 2106 by way of example, and not limitation, as well as an operating system, one or more application programs, other program modules, and program data. Each of the operating system, one or more application programs, other program modules, and program data or some combination thereof, may include an implementation of a networking environment. Program modules 2118 generally carry out the functions and/or methodologies of various embodiments of the invention as described herein.

The information processing system 2102 can also communicate with one or more external devices 2120 such as a keyboard, a pointing device, a display 2122, etc.; one or more devices that enable a user to interact with the information processing system 2102; and/or any devices (e.g., network card, modem, etc.) that enable computer system/server 2102 to communicate with one or more other computing devices. Such communication can occur via I/O interfaces 2124. Still yet, the information processing system 2102 can communicate with one or more networks such as a local area network (LAN), a general wide area network (WAN), and/or a public network (e.g., the Internet) via network adapter 2126. As depicted, the network adapter 2126 communicates with the other components of information processing system 2102 via the bus 2108. It should be understood that although not shown, other hardware and/or software components could be used in conjunction with the information processing system 2102. Examples, include, but are not limited to microcode, device drivers, redundant processing units, external disk drive arrays, RAID systems, tape drives, and data archival storage systems, etc.

As will be appreciated by one skilled in the art, aspects may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising: one or more processors and one or more computer-readable non-transitory storage media coupled to one or more of the processors, the one or more computer-readable non-transitory storage media comprising instructions operable when executed by one or more of the processors to cause the system to perform operations comprising:

receiving, from a task-requester computing device associated with a task to be distributed, an information set, associated with the task, generated using one or more templates, that includes a description of the task, a threshold number of task-execution information processing systems that are allowed to participate in the task, and at least one task-processing rule for accepting a task result received from a task-execution information processing system;

transmitting a first notification regarding the task to a set of one or more task-execution information processing systems, wherein the set of task-execution information processing systems satisfies the threshold number;

receiving a set of task results associated with the task from at least one task-execution information processing system of the set of one or more task-execution information processing systems, wherein each of the set of task results comprises markup language code representing the task result;

until the task-processing rule is satisfied, iteratively expanding the set of task results associated with the task by:

determining that at least one additional task result from at least one new task-execution information processing system is required to satisfy the task-processing rule by a comparison of the set of task results with the task-processing rule, wherein the task-processing rule comprises a threshold accuracy of the set of task results or a determined confidence in an accuracy of the set of task results;

in response to determining that at least one additional task result from at least one new task-execution information processing system is required to satisfy the task-processing rule, identifying the at least one new task-execution information processing system that is associated with hardware resources satisfying a condition relating to determining task-execution information processing systems that are to be allowed to participate in the task, wherein the hardware resources affect speed, efficiency, or accuracy when the at least one new task-execution information processing system performs the task;

updating the set of one or more task-execution information processing systems to include the at least one new task-execution information processing system; and transmitting a second notification regarding the task to the at least one new task-execution information processing system; and upon determining that the task-processing rule is satisfied, providing task result information for display, wherein the task result information is based on the set of task results associated with the task.

2. The system of claim 1, wherein the computer-readable non-transitory storage media further comprise instructions operable when executed by one or more of the processors to cause the system to perform operations further comprising:
communicatively coupling the one or more processors to:
at least one database associated with the task; and
each of the set of one or more task-execution information processing systems.

3. The system of claim 2, wherein the computer-readable non-transitory storage media further comprise instructions operable when executed by one or more of the processors to cause the system to perform operations further comprising:
communicatively coupling the one or more processors to at least one system configured to manage providing tokens to task-execution information processing systems for completed tasks that satisfy the task-processing rule.

4. The system of claim 1, wherein the computer-readable non-transitory storage media further comprise instructions operable when executed by one or more of the processors to cause the system to perform operations further comprising:
selecting at least one quality metric for a task-execution information processing system based on the information set associated with the task; and
identifying a particular task-execution information processing system in the set of one or more task-execution information processing system based on the quality metric, wherein the first notification is transmitted only to the identified task-execution information processing system.

5. The system of claim 4, wherein the at least one quality metric comprises at least one of:
an accuracy measurement of previous task results submitted by the task-execution information processing system;
an average task completion time associated with the task-execution information processing system; and
performance of the task-execution information processing system with respect to other task-execution information processing system of the set of one or more task-execution information processing systems for at least one previous task.

6. The system of claim 1, wherein the computer-readable non-transitory storage media further comprise instructions operable when executed by one or more of the processors to cause the system to perform operations further comprising:
determining a token to assign to a task-execution information processing system that submits a task result that satisfies the task-processing rule, wherein the first notification and the second notification comprise a notification of the token.

7. The system of claim 6, wherein the computer-readable non-transitory storage media further comprise instructions operable when executed by one or more of the processors to cause the system to perform operations further comprising:
modifying the token to assign to a task-execution information processing system that submits a task result that satisfies the task-processing rule; and
transmitting a third notification regarding the task and availability of the modified token to the task-execution information processing systems of the set of one or more task-execution information processing systems or the at least one new task-execution information processing system.

8. The system of claim 1, wherein the computer-readable non-transitory storage media further comprise instructions operable when executed by one or more of the processors to cause the system to perform operations further comprising:
determining that a given period of time has passed since the second notification was transmitted;
in response to determining that the given period of time has passed, updating the set of one or more task-execution information processing systems to include at least one new task-execution information processing system; and
transmitting a third notification regarding the task to the set of one or more task-execution information processing systems and the at least one new task-execution information processing system.

9. The system of claim 1, wherein the first notification and the second notification are transmitted using at least one of a website, a text message, an email message, and an application programming interface.

10. The system of claim 1, wherein the computer-readable non-transitory storage media further comprise instructions operable when executed by one or more of the processors to cause the system to perform operations further comprising:
determining the set of one or more task-execution information processing systems to which to transmit the first notification by selecting one or more task-execution information processing system based on profile information associated with each task-execution information processing system, wherein the profile information is independent of any previous task completed by each task-execution information processing system.

11. The system of claim 1, wherein the computer-readable non-transitory storage media further comprise instructions operable when executed by one or more of the processors to cause the system to perform operations further comprising:
determining a simplified version of the task; and
transmitting a notification regarding the simplified version of the task to the set of one or more task-execution information processing system.

12. The system of claim 11, wherein the computer-readable non-transitory storage media further comprise instructions operable when executed by one or more of the processors to cause the system to perform operations further comprising:
receiving at least one task result associated with the simplified version of the task from at least one task-execution information processing system of the set of one or more task-execution information processing systems, wherein the simplified version of the task requests verification of received task results.

13. The system of claim 1, wherein the computer-readable non-transitory storage media further comprise instructions operable when executed by one or more of the processors to cause the system to perform operations further comprising:
determining that a quality rating of a new task-execution information processing system satisfies a quality rating specified in the description of the task, wherein a notification regarding the task has not yet been transmitted to the new task-execution information processing system; and
adding the new task-execution information processing system to the set of one or more task-execution information processing system.

14. The system of claim 1, wherein the computer-readable non-transitory storage media further comprise instructions operable when executed by one or more of the processors to cause the system to perform operations further comprising:
identifying particular keywords in the description of the task;
determining that one or more of the keywords match keywords in profile information for a new task-execution information processing system, wherein a notification regarding the task has not yet been transmitted to the new task-execution information processing system; and
adding the new task-execution information processing system to the set of one or more task-execution information processing systems.

15. The system of claim 1, wherein the computer-readable non-transitory storage media further comprise instructions operable when executed by one or more of the processors to cause the system to perform operations further comprising:
in response to determining that the task-processing rule is satisfied by task results associated with the at least one task-execution information processing system of the set of one or more task-execution information processing systems or the at least one new task-execution information processing system, providing for display task result information based on the task results received from the at least one task-execution information processing system of the set of one or more task-execution information processing systems or the at least one new task-execution information processing system.

16. The system of claim 1, wherein the condition comprises a minimum processing speed, a minimum network bandwidth, or availability of a graphics processing unit (GPU).

17. The system of claim 1, wherein the one or more templates are selected from a plurality of templates associated with one or more aspects of the task, and wherein each template comprises at least one input field configured to accept a specified input for the associated aspect of the task or a specified operation associated with execution of the task.

18. One or more computer-readable non-transitory storage media including instructions that, when executed by one or more processors, are configured to cause the one or more processors to perform operations comprising:
receiving, from a task-requester computing device associated with a task to be distributed, an information set, associated with the task, generated using one or more templates, that includes a description of the task, a threshold number of task-execution information processing systems that are allowed to participate in the task, and at least one task-processing rule for accepting a task result received from a task-execution information processing system;
transmitting a first notification regarding the task to a set of one or more task-execution information processing systems, wherein the set of task-execution information processing systems satisfies the threshold number;
receiving a set of task results associated with the task from at least one task-execution information processing system of the set of one or more task-execution information processing systems, wherein each of the set of task results comprises markup language code representing the task result;
until the task-processing rule is satisfied, iteratively expanding the set of task results associated with the task by:
determining that at least one additional task result from at least one new task-execution information processing system is required to satisfy the task-processing rule by a comparison of the set of task results with the task-processing rule, wherein the task-processing rule comprises a threshold accuracy of the set of task results or a determined confidence in an accuracy of the set of task results;
in response to determining that at least one additional task result from at least one new task-execution information processing system is required to satisfy the task-processing rule, identifying the at least one new task-execution information processing system that is associated with hardware resources satisfying a condition relating to determining task-execution information processing systems that are to be allowed to participate in the task, wherein the hardware resources affect speed, efficiency, or accuracy when the at least one new task-execution information processing system performs the task;

updating the set of one or more task-execution information processing systems to include the at least one new task-execution information processing system; and transmitting a second notification regarding the task to the at least one new task-execution information processing system; and upon determining that the task-processing rule is satisfied, providing task result information for display, wherein the task result information is based on the set of task results associated with the task.

19. The one or more computer-readable non-transitory storage media of claim 18, wherein the instructions are further configured to cause the one or more processors to perform operations further comprising:

communicatively coupling the one or more processors to:
at least one database associated with the task; and
each of the set of one or more task-execution information processing systems.

20. A method comprising, by one or more processors of an information processing system:

receiving, from a task-requester computing device associated with a task to be distributed, an information set, associated with the task, generated using one or more templates, that includes a description of the task, a threshold number of task-execution information processing systems that are allowed to participate in the task, and at least one task-processing rule for accepting a task result received from a task-execution information processing system;

transmitting a first notification regarding the task to a set of one or more task-execution information processing systems, wherein the set of task-execution information processing systems satisfies the threshold number;

receiving a set of task results associated with the task from at least one task-execution information processing system of the set of one or more task-execution information processing systems, wherein each of the set of task results comprises markup language code representing the task result;

until the task-processing rule is satisfied, iteratively expanding the set of task results associated with the task by:

determining that at least one additional task result from at least one new task-execution information processing system is required to satisfy the task-processing rule by a comparison of the set of task results with the task-processing rule, wherein the task-processing rule comprises a threshold accuracy of the set of task results or a determined confidence in an accuracy of the set of task results;

in response to determining that at least one additional task result from at least one new task-execution information processing system is required to satisfy the task-processing rule, identifying the at least one new task-execution information processing system that is associated with hardware resources satisfying a condition relating to determining task-execution information processing systems that are to be allowed to participate in the task, wherein the hardware resources affect speed, efficiency, or accuracy when the at least one new task-execution information processing system performs the task;

updating the set of one or more task-execution information processing systems to include the at least one new task-execution information processing system; and transmitting a second notification regarding the task to the at least one new task-execution information processing system; and upon determining that the task-processing rule is satisfied, providing task result information for display, wherein the task result information is based on the set of task results associated with the task.

* * * * *